(12) United States Patent
Kim et al.

(10) Patent No.: US 9,407,489 B2
(45) Date of Patent: Aug. 2, 2016

(54) CELL IDENTITY DESIGN FOR LTE-ADVANCED

(71) Applicant: BlackBerry Limited, Waterloo (CA)

(72) Inventors: Joon Beom Kim, Carrollton, TX (US); Hua Xu, Ottawa (CA); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 115 days.

(21) Appl. No.: 13/749,508

(22) Filed: Jan. 24, 2013

(65) Prior Publication Data

US 2014/0204809 A1 Jul. 24, 2014

(51) Int. Cl.
| | |
|---|---|
| *H04W 72/04* | (2009.01) |
| *H04L 27/26* | (2006.01) |
| *H04L 5/00* | (2006.01) |
| *H04J 13/00* | (2011.01) |
| *H04J 11/00* | (2006.01) |

(52) U.S. Cl.
CPC ......... *H04L 27/2655* (2013.01); *H04J 13/0062* (2013.01); *H04L 5/0048* (2013.01); *H04L 27/2613* (2013.01); *H04L 27/2692* (2013.01); *H04J 11/0069* (2013.01)

(58) Field of Classification Search
None
See application file for complete search history.

(56) References Cited

U.S. PATENT DOCUMENTS

| | | | |
|---|---|---|---|
| 8,249,006 B2 | 8/2012 | Qu et al. | |
| 8,437,303 B2 * | 5/2013 | Dinan | 370/329 |
| 8,804,586 B2 * | 8/2014 | Fong et al. | 370/311 |
| 2008/0253484 A1 * | 10/2008 | Kakura | H04L 27/2613 375/343 |
| 2009/0046645 A1 * | 2/2009 | Bertrand et al. | 370/329 |
| 2009/0086713 A1 | 4/2009 | Luo | |
| 2010/0265814 A1 | 10/2010 | Iwai et al. | |
| 2011/0170496 A1 | 7/2011 | Fong et al. | |
| 2012/0087326 A1 * | 4/2012 | Qu et al. | 370/329 |
| 2012/0140660 A1 | 6/2012 | Kang et al. | |
| 2012/0201164 A1 | 8/2012 | Jngren et al. | |
| 2012/0236977 A1 | 9/2012 | Zou et al. | |
| 2013/0114419 A1 * | 5/2013 | Chen et al. | 370/248 |
| 2013/0114530 A1 * | 5/2013 | Chen et al. | 370/329 |
| 2013/0229953 A1 * | 9/2013 | Nam et al. | 370/280 |
| 2014/0177427 A1 * | 6/2014 | Yiu et al. | 370/208 |

(Continued)

FOREIGN PATENT DOCUMENTS

| | | |
|---|---|---|
| WO | 2012149559 A1 | 11/2012 |
| WO | 2012167471 A1 | 12/2012 |

OTHER PUBLICATIONS

3GPP TS 36.211 V10.6.0; 3rd Generation Partnership Project; Technical Specification Group Radio Access Network; Evolved Universal Terrestrial Radio Access (E-UTRA); Physical Channels and Modulation; Release 10; Dec. 2012; 101 pages.

(Continued)

*Primary Examiner* — Huy D Vu
*Assistant Examiner* — Hong Shao
(74) *Attorney, Agent, or Firm* — Conley Rose, P.C.; J. Robert Brown, Jr.

(57) ABSTRACT

A method for generating a synchronization signal is provided. The method comprises using a number other than 63 as an $N_{ZC}$ value in a Zadoff-Chu sequence used in generating a primary synchronization signal for a wireless communication system, which may be a 3GPP LTE system or a 3GPP LTE-A system.

24 Claims, 17 Drawing Sheets

(56) References Cited

U.S. PATENT DOCUMENTS

2014/0233663 A1* 8/2014 Kang et al. .................. 375/260
2014/0314072 A1* 10/2014 Awad et al. .................. 370/350

OTHER PUBLICATIONS

3GPP TS 36.211 V11.1.0; 3rd Generation Partnership Project; Technical Specification Group Radio Access Network; Evolved Universal Terrestrial Radio Access (E-UTRA); Physical Channels and Modulation; Release 11; Dec. 2012; 108 pages.
3GPP TS 36.212 V10.7.0; 3rd Generation Partnership Project; Technical Specification Group Radio Access Network; Evolved Universal Terrestrial Radio Access (E-UTRA); Multiplexing and Channel Coding; Release 10; Dec. 2012; 79 pages.
3GPP TS 36.212 V11.1.0; 3rd Generation Partnership Project; Technical Specification Group Radio Access Network; Evolved Universal Terrestrial Radio Access (E-UTRA); Multiplexing and Channel Coding; Release 11; Dec. 2012; 82 pages.
3GPP TS 36.213 V10.8.0; 3rd Generation Partnership Project; Technical Specification Group Radio Access Network; Evolved Universal Terrestrial Radio Access (E-UTRA); Physical Layer Procedures; Release 10; Dec. 2012; 126 pages.
3GPP TS 36.213 V11.1.0; 3rd Generation Partnership Project; Technical Specification Group Radio Access Network; Evolved Universal Terrestrial Radio Access (E-UTRA); Physical Layer Procedures; Release 11; Dec. 2012; 160 pages.
3GPP TS 36.331 V10.8.0; 3rd Generation Partnership Project; Technical Specification Group Radio Access Network; Evolved Universal Terrestrial Radio Access (E-UTRA); Radio Resource Control (RRC); Protocol Specification; Release 10; Dec. 2012; 305 pages.
3GPP TS 36.331 V11.2.0; 3rd Generation Partnership Project; Technical Specification Group Radio Access Network; Evolved Universal Terrestrial Radio Access (E-UTRA); Radio Resource Control (RRC); Protocol Specification; Release 11; Dec. 2012; 340 pages.
3GPP TSG-RAN WG4 (Radio) Meeting #54; "[Draft] Reply LS on Additional Carrier Types for LTE-A"; R4-100977; San Francisco, USA; Feb. 22-26, 2010; 1 page.
3GPP TSG RAN WG1 Meeting #68bis; "Time and Frequency Synchronization Performance Evaluation"; R1-121491; Jeju, Korea; Mar. 26-30, 2012; 8 pages.
3GPP TSG RAN WG1 Meeting #68bis; "Design of Additional Carrier Types in Rel-11"; R1-121082; Jeju, Korea; Mar. 26-30, 2012; 3 pages.
3GPP TSG-RAN WG1 Meeting #60bis; "Reply Ls on Additional Carrier Types for Lte-A"; R1-101712; Beijing, China; Apr. 12-16, 2010; 1 page.
3GPP TSG RAN WG1 Meeting #68bis; "Synchronization Performance on Additional Carrier Types"; R1-121019; Jeju, Korea; Mar. 26-30, 2012; 9 pages.
TSG RAN Meeting #52; "Update to Lte Carrier Aggregation Enhancements WID"; RP-110732; Bratislava, Slovakia; May 31-Jun. 3, 2011; 8 pages.
3GPP TSG RAN Meeting #51; "LTE Carrier Aggregation Enhancements"; RP-110451; Kansas City, USA; Mar. 15-18, 2011; 6 pages.
Sesia, Stefania, et al.; "LTE the UMTS Long Term Evolution From Theory to Practice"; Second Edition; Date: 2011; 794 pages.
PCT International Search Report; Application No. PCT/US2014/012944; Jul. 18, 2014; 4 pages.
PCT Written Opinion of the International Searching Authority; Application No. PCT/US2014/012944; Jul. 18, 2014; 9 pages.

* cited by examiner

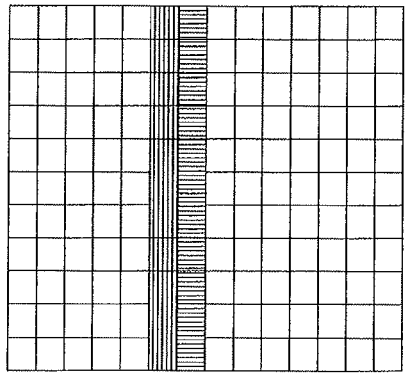
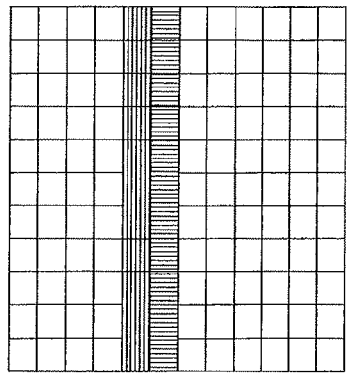
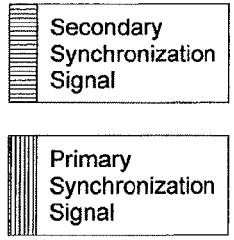
Figure 11a      Figure 11b
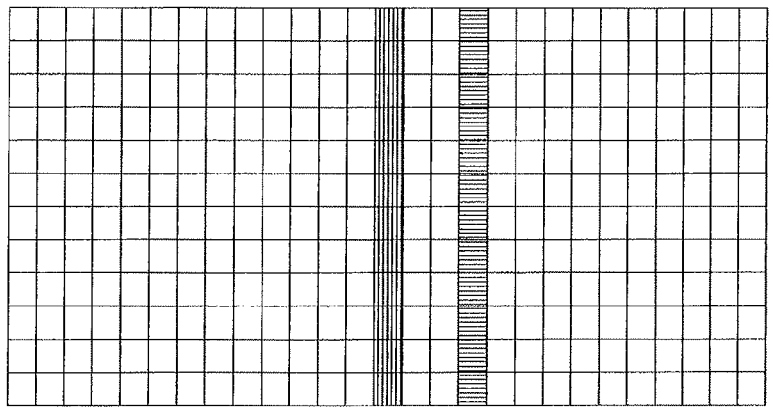
Figure 11c
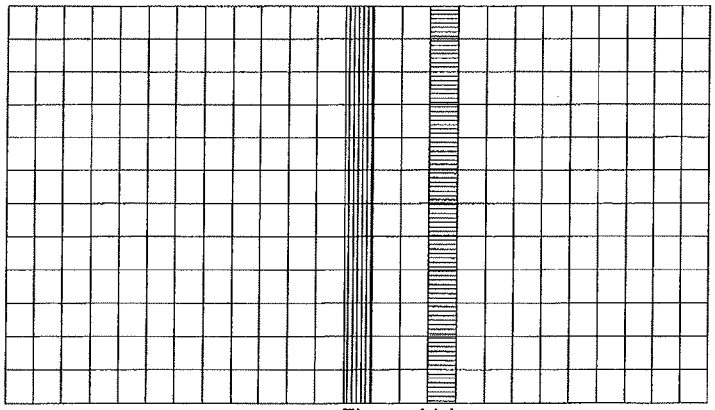
Figure 11d

CELL IDENTITY DESIGN FOR LTE-ADVANCED

FIELD OF THE DISCLOSURE

The present disclosure relates to cell identity design in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node or a network element.

LTE may be said to correspond to Third Generation Partnership Project (3GPP) Release 8 (Rel-8), Release 9 (Rel-9), and Release 10 (Rel-10), and possibly also to releases beyond Release 10, while LTE Advanced (LTE-A) may be said to correspond to Release 10, Release 11 (Rel-11), and possibly also to releases beyond Release 10 and Release 11. As used herein, the terms "legacy", "legacy UE", and the like might refer to signals, UEs, and/or other entities that comply with LTE Release 10 and/or earlier releases but do not comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 11a, 11b, 11c, and 11d are diagrams of examples of locations of synchronization signals for small cells, pico cells, or stand-alone NCTs, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

The 3GPP LTE-A standards seek to achieve enhanced system performance by using the currently available frequency spectrum in a more efficient manner. The peak target data rates in LTE-A are 1 gigabit per second (Gbps) for the downlink and 500 megabits per second (Mbps) for the uplink. LTE-A proposes several potential approaches to achieve the target rates. The carrier aggregation (CA) technique utilizes bandwidth aggregation of a variety of different arrangements of component carriers (CCs), including the same or different bandwidths and adjacent or non-adjacent CCs in the same frequency band or different frequency bands. To achieve CA-based enhancements in LTE-A, recent 3GPP standards investigate a new carrier type (NCT) scenario that is implemented for non-stand-alone carrier types in Rel-11 and that may not have backward compatibility issues in future releases. NCT may also be implemented as a stand-alone system. To deal with new carrier types, especially densely populated networks with heterogeneous networks (HetNets) or a small cell design, a new cell identity design may also be considered. Embodiments of the present disclosure provide new cell identity design approaches for the downlink to achieve better spectral efficiency and interference coordination by providing more degrees of freedom for future cell deployments, such as small cells, new carrier types, or evolved HetNet scenarios. Any set of cells that includes a cell with a relatively smaller coverage area within the coverage of a cell with a relatively larger coverage area may be referred to herein as a set of heterogeneous cells or a heterogeneous network. The cell with the relatively larger coverage area may be referred to herein as a macro cell, and the cell with the relatively smaller coverage area may be referred to herein as a small cell or a pico cell, as examples.

To aid in the description of the embodiments, some background information will first be provided regarding LTE subframes, cell searches, Zadoff-Chu sequences, synchronization signals, cell-specific reference signals, new carrier types, and small cells.

Figure 1:
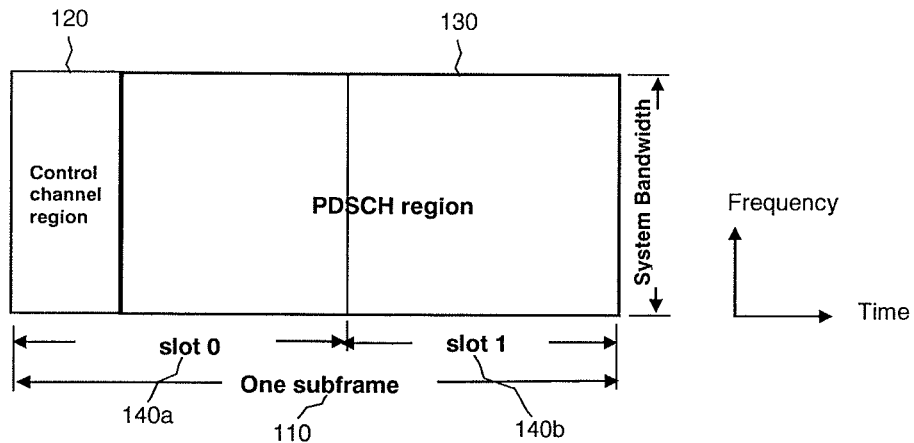
FIG. 1 is a diagram of a downlink LTE subframe.

FIG. 1 illustrates a typical downlink (DL) LTE subframe 110. Control information such as the physical downlink control channel (PDCCH), the physical control format indicator channel (PCFICH), and the physical HARQ (hybrid automatic repeat request) indicator channel (PHICH) are transmitted in a control channel region 120. The control channel region 120 includes the first few OFDM (orthogonal frequency division multiplexing) symbols in the subframe 110. The exact number of OFDM symbols for the control channel region 120 is either dynamically indicated by the PCFICH, which is transmitted in the first symbol, or semi-statically configured when cross carrier scheduling is configured in the case of carrier aggregation in LTE Rel-10.

The PDSCH (physical downlink shared channel), PBCH (physical broadcast channel), PSC/SSC (primary synchronization channel/secondary synchronization channel), and CSI-RS (channel state information reference signal) are transmitted in a PDSCH region 130. DL user data is carried by the PDSCH channels scheduled in the PDSCH region 130. Cell-specific reference signals (CRSs) are transmitted over both the control channel region 120 and the PDSCH region 130.

Each subframe 110 can include a number of OFDM symbols in the time domain and a number of subcarriers in the frequency domain. An OFDM symbol in time and a subcarrier in frequency together define a resource element (RE). A physical resource block (RB or PRB) can be defined as, for example, 12 consecutive subcarriers in the frequency domain and all the OFDM symbols in a slot in the time domain. An RB pair with the same RB index in slot 0 (140a) and slot 1 (140b) in a subframe can be allocated together.

Figure 2:
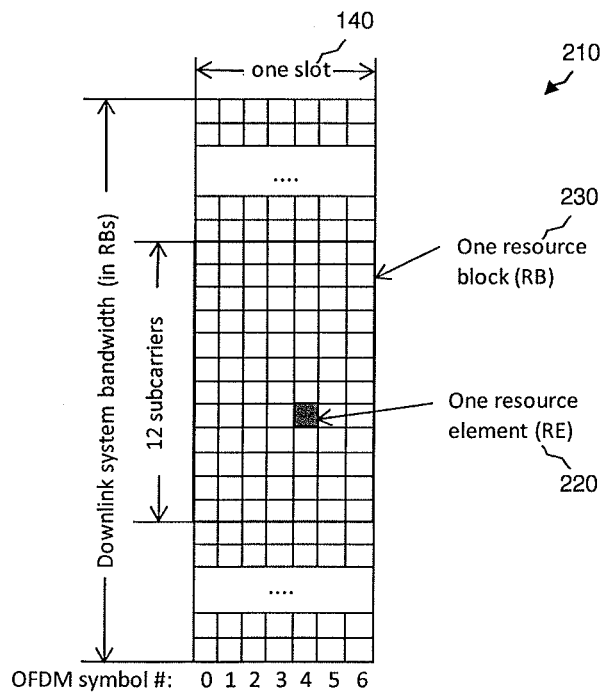
FIG. 2 is a diagram of an LTE downlink resource grid in the case of a normal cyclic prefix.

FIG. 2 shows an LTE DL resource grid 210 within each slot 140 in the case of a normal cyclic prefix (CP) configuration.

The resource grid 210 is defined for each antenna port, i.e., each antenna port has its own separate resource grid 210. Each element in the resource grid 210 for an antenna port is an RE 220, which is uniquely identified by an index pair of a subcarrier and an OFDM symbol in a slot 140. An RB 230 includes a number of consecutive subcarriers in the frequency domain and a number of consecutive OFDM symbols in the time domain, as shown in the figure. An RB 230 is the minimum unit used for the mapping of certain physical channels to REs 220.

Figure 3:
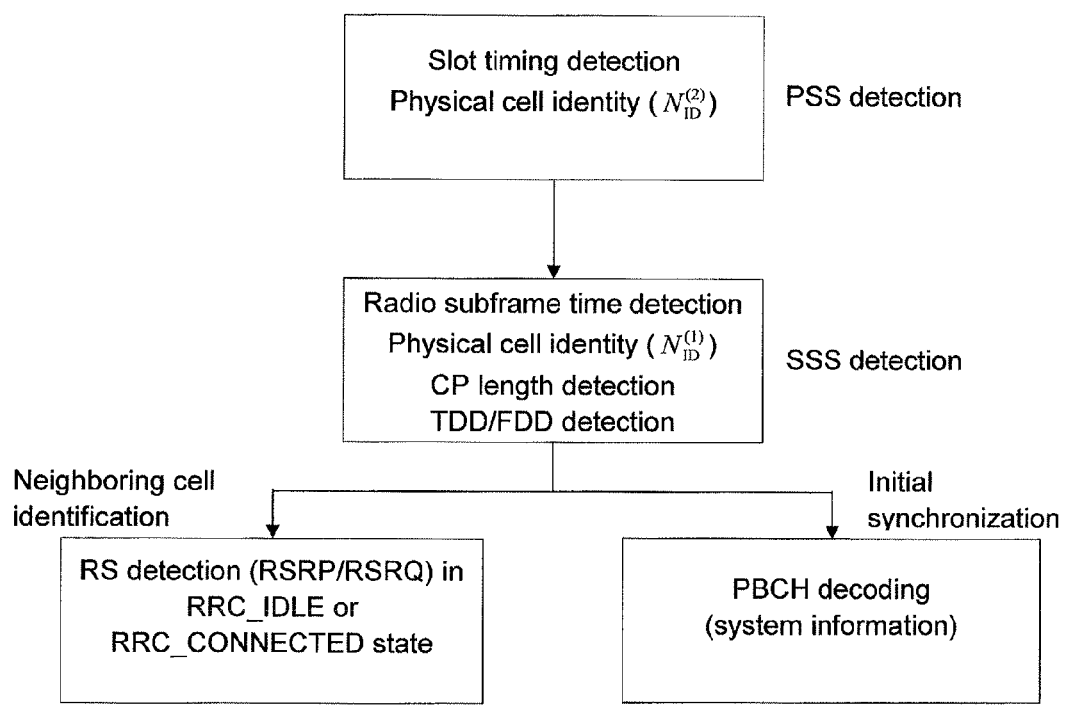
FIG. 3 is a diagram of a cell search procedure in LTE.

The macro cell search procedure in LTE begins with a synchronization procedure in each cell that utilizes a primary synchronization signal (PSS) and a secondary synchronization signal (SSS), as shown in FIG. 3. The detection of the two signals provides a UE with time and frequency synchronization, the physical cell identity, the length of the cyclic prefix, and whether frequency division duplex (FDD) or time division duplex (TDD) is being used.

In the initial synchronization, after detecting the synchronization signals, the UE decodes the PBCH to obtain system information. In a neighboring cell search, the UE does not need to decode the PBCH but instead evaluates the quality of the reference signals that are transmitted from the detected cells. The set of neighboring cells is used for cell reselection in the RRC IDLE state or for handover in the RRC_CONNECTED state.

A Zadoff-Chu (ZC) sequence is a non-binary sequence with unit amplitude that satisfies a constant-amplitude zero-autocorrelation (CAZAC) property. A ZC sequence of odd-length $N_{ZC}$ is given by:

$$a_q(n) = e^{-j\frac{2\pi qn(n+1)/2+ln}{N_{ZC}}} \quad (1)$$

where $q \in \{1, \ldots, N_{ZC}-1\}$ is the ZC sequence root index, n=0, 1, ..., $N_{ZC}-1$, and l is any integer, but l=0 in LTE. A ZC sequence has at least three noteworthy properties. A first property is that a ZC sequence has a constant amplitude and its $N_{ZC}$-point discrete Fourier transform (DFT) also has a constant amplitude. A second property is that the cyclic auto-correlation is a delta function. A third property is that the absolute value of the cyclic cross-correlation function between any two ZC sequences is constant and is equal to $1/\sqrt{N_{ZC}}$ if $|q_1-q_2|$ is relatively prime with respect to $N_{ZC}$, where $q_1$ and $q_2$ are the sequence indices, respectively, and $N_{ZC}$ is a prime number.

There are 504 unique physical layer cell identities. The physical layer cell identities are grouped into 168 unique physical layer cell identity groups, each group containing three unique identities. The grouping is such that each physical layer cell identity is part of one and only one physical layer cell identity group. A physical layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical layer cell identity group, and a number $N_{ID}^{(2)}$ in the range of 0 to 2, representing the physical layer identity within the physical layer cell identity group.

The sequence d(n) used for the primary synchronization signal is generated from a frequency domain Zadoff-Chu sequence according to the following equation from 3GPP Technical Specification (TS) 36.211:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad (2)$$

where the Zadoff-Chu root sequence index u is given by Table 1.

TABLE 1

Root indices for the primary synchronization signal

| $N_{ID}^{(2)}$ | Root index u |
|---|---|
| 0 | 25 |
| 1 | 29 |
| 2 | 34 |

The sequence $d(0), \ldots, d(61)$ used for the secondary synchronization signal is an interleaved concatenation of two binary sequences with a length of 31. The concatenated sequence is scrambled with a scrambling sequence given by the PSS. The combination of the two length-31 sequences defining the SSS differs between subframe 0 and subframe 5 according to:

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad (3)$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

where $0 \leq n \leq 30$. The indices $m_0$ and $m_1$ are derived from the physical layer cell identity group $N_{ID}^{(1)}$ according to:

$$m_0 = m' \bmod 31 \quad (4)$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor,$$
$$q' = \lfloor N_{ID}^{(1)}/30 \rfloor$$

where the output of the above expression is listed in Table 2 below.

The two sequences $s_0^{(m_0)}(n)$ and $s_1^{(m_1)}(n)$ are defined as two different cyclic shifts of the m-sequence $\tilde{s}(n)$ according to:

$$s_0^{(m_0)}(n) = \tilde{s}((n+m_0) \bmod 31)$$

$$s_1^{(m_1)}(n) = \tilde{s}((n+m_1) \bmod 31)$$

where $\tilde{s}(i) = 1 - 2x(i)$, $0 \leq i \leq 30$, is defined by:

$$x(\bar{i}+5) = (x(\bar{i}+2) + x(\bar{i})) \bmod 2, 0 \leq \bar{i} \leq 25$$

with initial conditions $x(0)=0$, $x(1)=0$, $x(2)=0$, $x(3)=0$, $x(4)=1$.

The two scrambling sequences $c_0(n)$ and $c_1(n)$ depend on the primary synchronization signal and are defined by two different cyclic shifts of the m-sequence $\tilde{c}(n)$ according to:

$$c_0(n) = \tilde{c}((n+N_{ID}^{(2)}) \bmod 31)$$

$$c_1(n) = \tilde{c}((n+N_{ID}^{(2)}+3) \bmod 31)$$

where $N_{ID}^{(2)} \in \{0,1,2\}$ is the physical layer identity within the physical layer cell identity group $N_{ID}^{(1)}$ and $\tilde{c}(i) = 1 - 2x(i)$, $0 \leq i \leq 30$, is defined by:

$$x(\bar{i}+5) = (x(\bar{i}+3) + x(\bar{i})) \bmod 2, 0 \leq \bar{i} \leq 25$$

with initial conditions $x(0)=0$, $x(1)=0$, $x(2)=0$, $x(3)=0$, $x(4)=1$.

The scrambling sequences $z_1^{(m_0)}(n)$ and $z_1^{(m_1)}(n)$ are defined by a cyclic shift of the m-sequence $\tilde{z}(n)$ according to:

$$z_1^{(m_0)}(n) = \tilde{z}((n+(m_0 \bmod 8)) \bmod 31)$$

$$z_1^{(m_1)}(n) = \tilde{z}((n+(m_1 \bmod 8)) \bmod 31)$$

where $m_0$ and $m_1$ are obtained from Table 2 and $\tilde{z}(i) = 1 - 2x(i)$, $0 \leq i \leq 30$, is defined by:

$$x(\bar{i}+5) = (x(\bar{i}+4) + x(\bar{i}+2) + x(\bar{i}+1) + x(\bar{i})) \bmod 2, 0 \leq \bar{i} \leq 25$$

with initial conditions $x(0)=0$, $x(1)=0$, $x(2)=0$, $x(3)=0$, $x(4)=1$.

TABLE 2

Mapping between physical layer cell identity group $N_{ID}^{(1)}$ and indices $m_0$ and $m_1$

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |

TABLE 2-continued

Mapping between physical layer cell identity group $N_{ID}^{(1)}$ and indices $m_0$ and $m_1$

| $N_{ID}^{(1)}$ | $m_0$ | $m_1$ |
|---|---|---|
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Figures 4A, 4B:
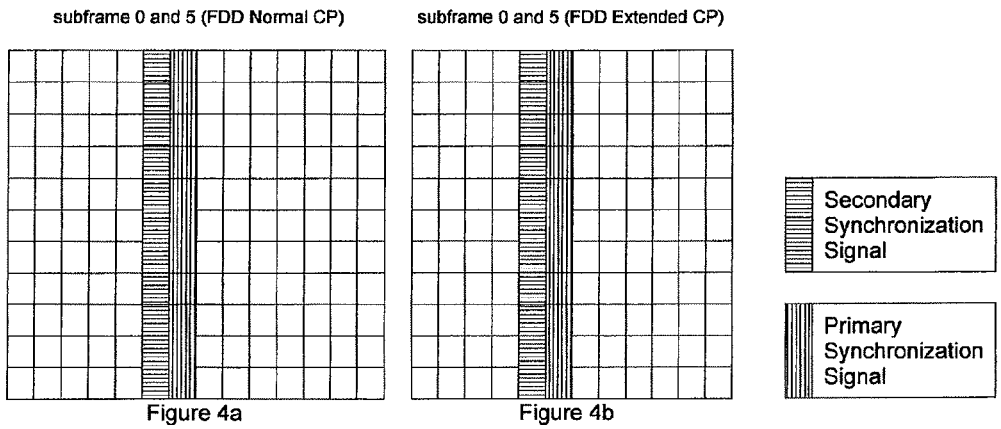
FIGS. 4a, 4b, 4c, and 4d are diagrams of locations of synchronization signals in LTE Releases 8, 9, 10, and 11.
Figure 4C:
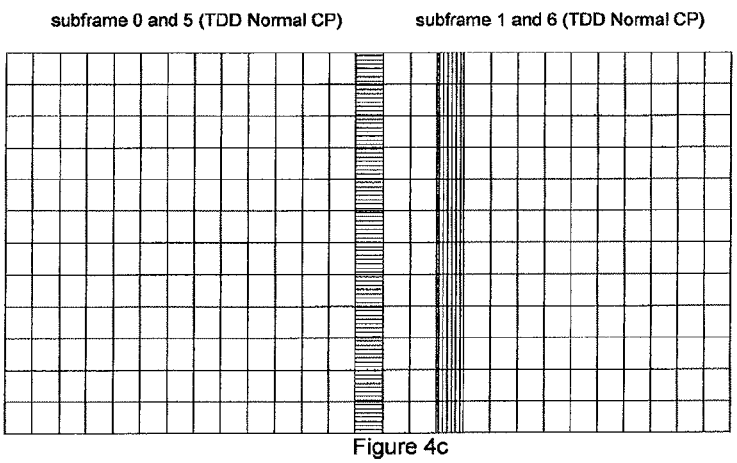
Figure 4D:
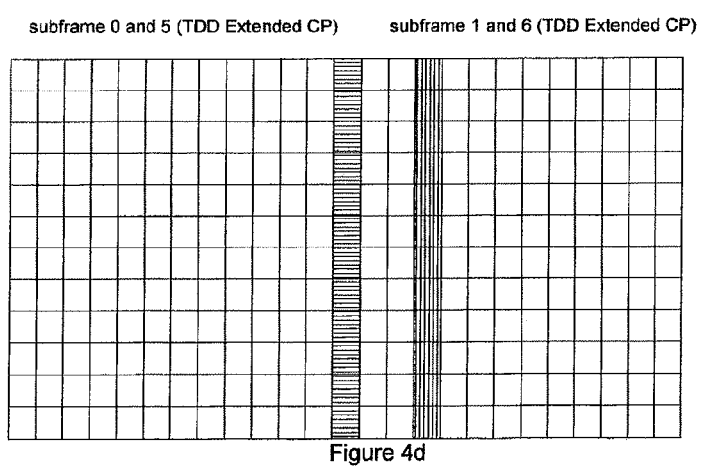

The 3GPP standards specify that synchronization signals are located in subframes 0 and 5 for FDD and subframes 0/1 and 5/6 for TDD, as shown in FIGS. 4a through 4d. As shown in FIGS. 4a and 4b, the PSS is placed in the last OFDM symbol in the first slot of subframes 0 and 5 for FDD systems. For TDD systems, the PSS is placed in the third OFDM symbol in the first slot of subframes 1 and 6, as shown in FIGS. 4c and 4d. The SSS is placed in the second to last OFDM symbol in the first slot of subframes 0 and 5 for FDD systems, as shown in FIGS. 4a and 4b. For TDD systems, the SSS is located in the last OFDM symbol of subframes 0 and 5, as shown in FIGS. 4c and 4d.

The synchronization signals are placed in the central six resource blocks, where 62 resource elements are occupied for all operating bandwidths. Since the length of the PSS and SSS is constant for all operating bandwidths, the overhead is largest for the case of the smallest operating bandwidth. This is because the PSS and SSS are transmitted almost on the entire bandwidth. Also, the overhead is larger for an extended cyclic prefix due to the longer duration of the OFDM symbol, thus resulting in fewer available OFDM symbols.

The number of resource elements within the considered measurement frequency bandwidth and within the measurement period that are used by the UE to determine the reference signal received power (RSRP) is left up to the UE implementation, with the limitation that the corresponding measurement accuracy requirements may need to be fulfilled. The power per resource element is determined from the energy received during the useful part of the symbol, excluding the cyclic prefix.

Figure 5A:
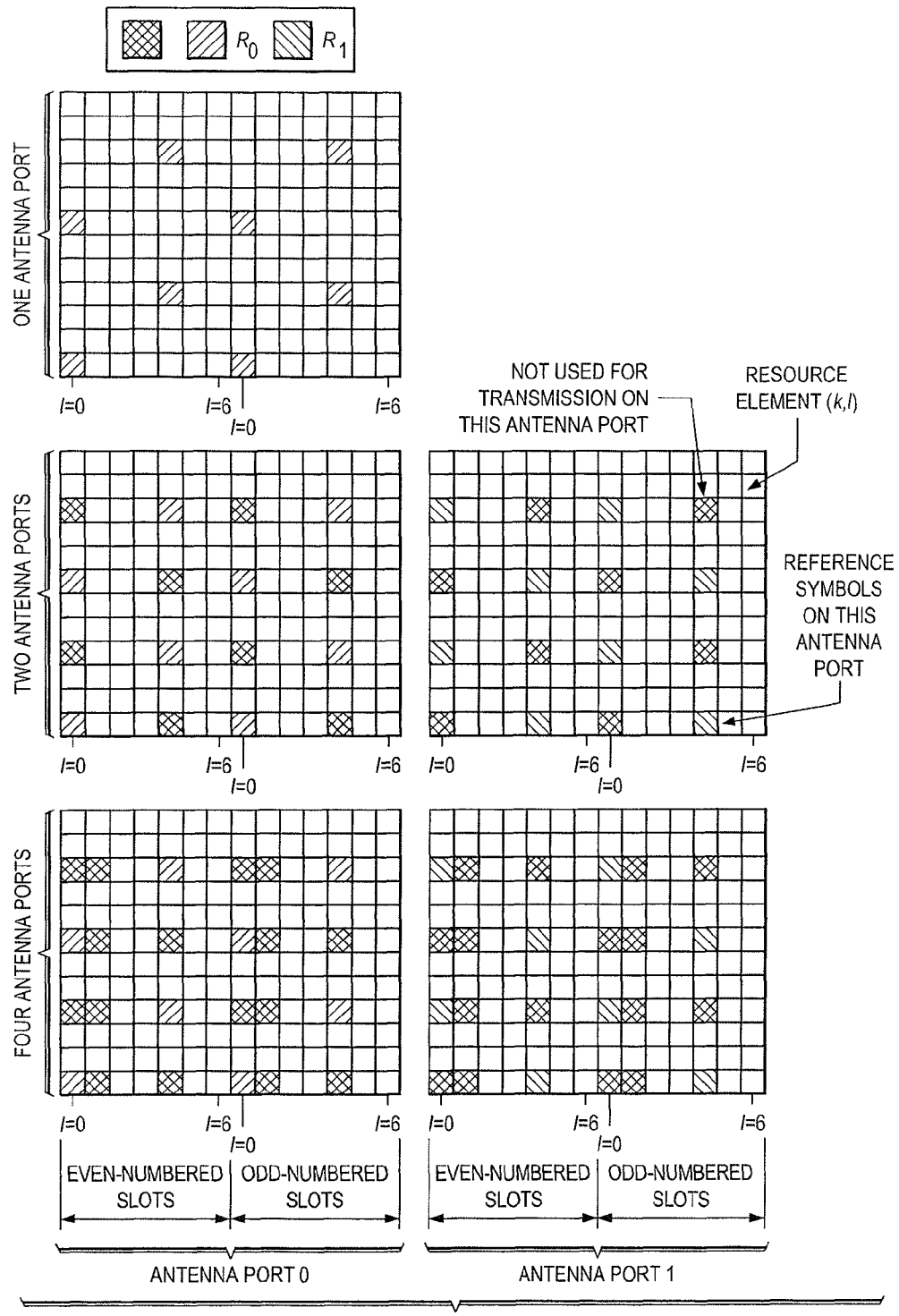
FIG. 5 depicts mappings of downlink reference signals for a normal cyclic prefix.
Figure 5B:
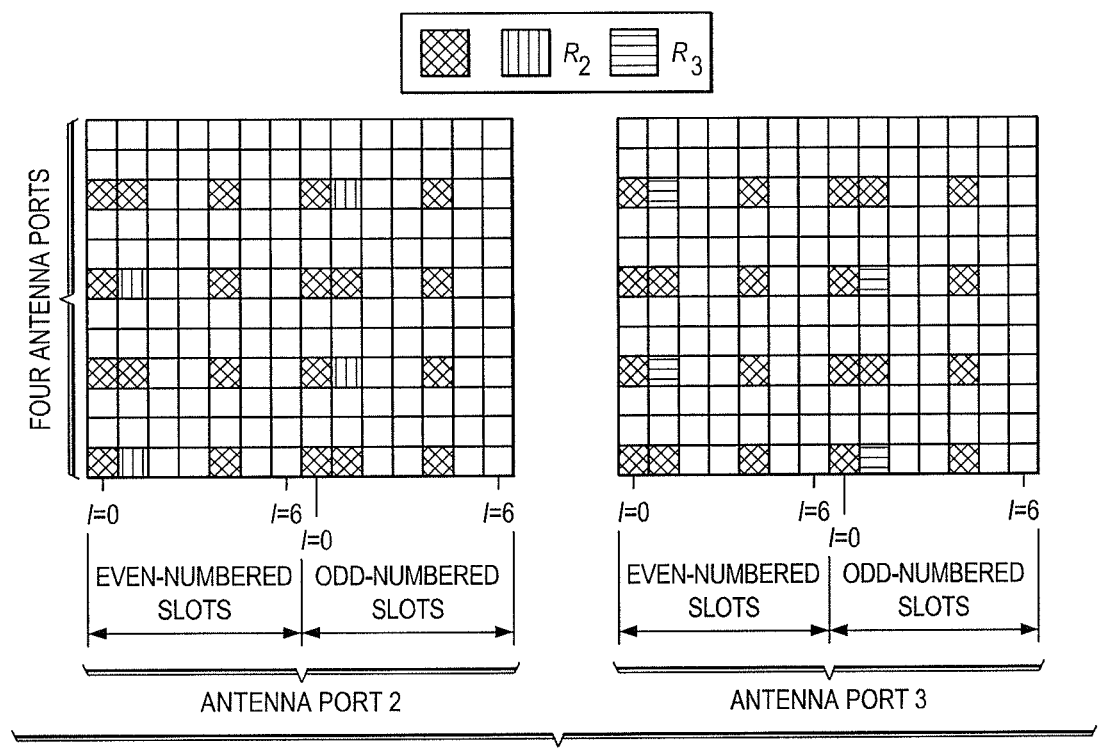

In Rel-8/9/10/11, cell-specific reference signals (CRSs) are used mainly for channel quality estimation for control channels and for PDSCH transmissions that do not use UE-specific reference signals. Further, CRSs as well as the PSS/SSS may be used for time and frequency synchronization while the UE is in either the connected mode or the idle mode. The existing RSRP/RSRQ (reference signal received quality) measurements for a configurable bandwidth are performed over a measurement bandwidth. As shown in FIG. 5, antenna port numbers 0 to 3 may be used by an eNB to provide four separate channel estimates. For each antenna port, a different reference signal mapping pattern has been designed to minimize the intra- or inter-cell interference between multiple transmit antenna ports. The staggered reference signal pattern is used to reduce inter-cell interference. It should be noted that the number of reference signals for the third and fourth antenna ports is half that for the first antenna port, since a high speed UE is unlikely to use all four antenna ports to achieve sufficient channel estimation accuracy.

In Rel-10, both extension carriers and carrier segments were proposed as additional carrier types with backward compatibility. However, it was concluded that the extension carriers would not be adopted in Rel-10. In Rel-11/12, a carrier aggregation enhancement work item introduced additional carrier types to study the potential benefits of including non-backward compatible scenarios.

Figure 6:
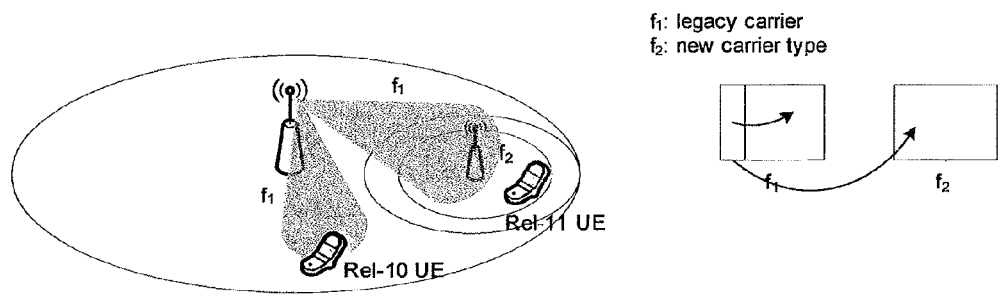
FIG. 6 is a diagram of a heterogeneous network scenario for new carrier types.

The additional carrier types identified for carrier aggregation may provide enhanced spectral efficiency, improved support for HetNets using low-power remote radio heads (RRHs), and energy efficiency. For an unsynchronized new carrier type (NCT), an RRH may be deployed in a dense area to enhance capacity and/or at a cell edge to improve cell edge performance. In particular, small cells may be deployed over macro cells by using low-power nodes, resulting in HetNet scenarios such as that shown in FIG. 6. In a HetNet environment, shared cell identity (ID) scenarios, where legacy carriers on macro cells overlap with additional carriers on densely populated pico cells, may benefit from a reduction in interference between the pico cells due to minimization of mandatory transmissions. Also, in the scenario in FIG. 6, the backward compatible carrier, $f_1$, is configured at CC1 as a primary cell (PCell), while a new carrier, $f_2$, is configured at CC2 as a secondary cell (SCell). Then, dynamic interference coordination may be performed by dynamically controlling the resource allocation and transmission powers. Further, by reducing the overhead due to the PDCCH and the CRS, the spectral efficiency of a new carrier may be enhanced.

Therefore, as a potential system design, NCT systems may not require the following channels or signals: PBCH, Rel-8 SIB, Paging, PSS, SSS, PDCCH, PHICH, PCFICH, and CRS.

Small cells using low-power nodes are considered promising to cope with increased mobile traffic, especially for hotspot deployments in indoor and outdoor scenarios. A low-power node generally means a node whose transmission power is lower than the macro node and base station classes. For example, pico eNBs and femto eNBs may be considered low-power nodes. Small cell enhancements for E-UTRA and E-UTRAN may focus on additional functionalities for enhanced performance in hotspot areas for indoor and outdoor using low-power nodes.

Figure 7:
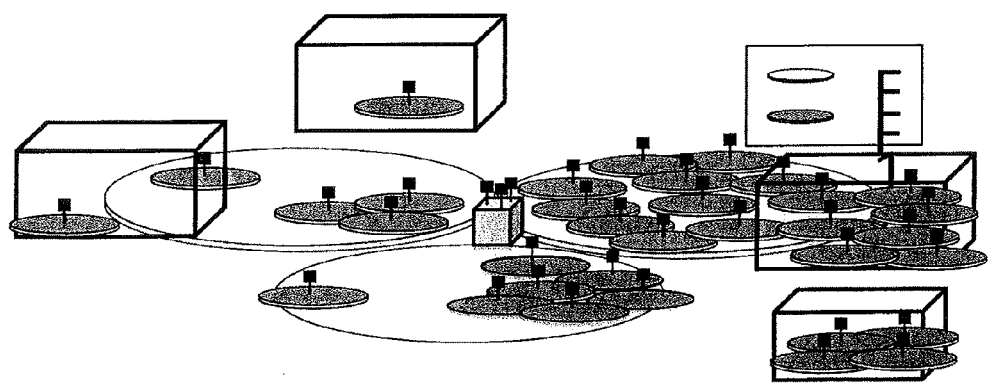
FIG. 7 depicts deployment scenarios of small cells with and without macro coverage.

Small cell enhancements may target scenarios both with macro coverage and without macro coverage, both outdoor and indoor small cell deployments, and both ideal and non-ideal backhaul. Both sparse and dense small cell deployments may be considered, as shown in FIG. 7.

Both synchronized and unsynchronized scenarios may be considered between small cells as well as between small cells and macro cells. For specific operations, e.g., interference coordination, carrier aggregation and inter-eNB coordinated multi-point (CoMP), small cell enhancement may benefit from synchronized deployments with respect to small cell search/measurement and interference/resource management. Therefore, time synchronized deployments of small cell clusters may be prioritized in the future and new means to achieve such synchronization may be considered.

With this background information in place, issues identified and addressed by the embodiments disclosed herein may now be described. In Rel-8/9/10, the number of physical cell identities (PCIs) is 504, as described above. In Rel-11, cooperative multiple-input multiple-output (MIMO) schemes, such as CoMP and HetNet schemes, were proposed inside existing cell deployments. For example, four low-power RRHs may be placed in the coverage of each macro cell, thus requiring 285 different cell identities in the two-tier cell deployment scenarios. However, the number of cell identities may not be sufficient to support HetNet scenarios and coordinate interference between the identities that do not have good correlation properties out of the 504 candidates. If the same $N_{ID}^{(2)}$, $m_0$, or $m_1$ in Equation (4) above is assigned to adjacent cells, the synchronization procedure may exhibit poor performance due to long synchronization timing and higher interference. For example, if $PCI_0=0$, then the PCIs={3, 6, . . . , 498, 501, 1, 2, 90, 91, 92, 177, 178, 179, 261, 262, 263, 342, 343, 344, 420, 421, 422, 495, 496, 497} will not be optimal for adjacent cells.

As mentioned above, the number of PCIs may be insufficient for densely populated network environments, such as HetNets or small cell environments, due to interference between macro and pico cells. That is, for scenarios with densely populated networks, the number of combinations of PSS and SSS may not be sufficient to support future networks. Furthermore, the length of the PSS may not need to be the same as that of the SSS because PSS synchronization or frame synchronization is performed on the time domain to obtain the frame/time boundary at the initial synchronization process, while frequency offset synchronization is done on the frequency domain. Therefore, PSS/SSS design may need to be carefully considered.

Embodiments of the present disclosure provide a PSS/SSS design that improves interference coordination during the synchronization procedure for densely populated cell deployments, such as stand-alone NCTs, HetNets, or small cell scenarios. Two sets of embodiments that may be used independently of one another or in combination with one another are disclosed. In a first set of embodiments, the size of the synchronization signal candidate set is increased. In a second set of embodiments, distinct time-frequency locations are provided for the PSS/SSS. In other words, to deal with the issues described above related to the same $N_{ID}^{(2)}$, $m_0$, or $m_1$, either a larger size of the candidate sets for the PSS/SSS, distinct PSS/SSS locations for macro and pico cells, or both may be implemented.

A set of embodiments directed to an increased cardinality of the synchronization signal candidate set will be considered first. In these embodiments, a scheme to provide flexible interference coordination is disclosed, wherein the candidate sets for synchronization signals are extended in terms of the number of available prime numbers. The total number of available resource elements for six resource blocks (RBs) is 72. From the perspective of legacy support for existing standards, the maximum achievable length $N_{ZC}$ of the PSS is 71. Currently, the value of $N_{ZC}$ is specified to be 63. In an embodiment, $N_{ZC}$ may have a value other than 63. For example, $N_{ZC}$ may be a prime number greater than 63, such as 67 or 71. If a shorter length is considered, then values of $N_{ZC}$ such as 61, 59, and so on can be used in cases where the corresponding PSS shows comparable performance over the current PSS scheme.

In a first alternative under this first set of embodiments, PSS extensions with $N_{ZC}=67$ are disclosed. In this alternative, a new PSS occupying 66 resource elements (REs) out of the total available 72 REs is provided and is given by:

$$d_u(n) = \begin{cases} e^{-j\frac{\pi un(n+1)}{67}} & n = 0, 1, \ldots, 32 \\ e^{-j\frac{\pi u(n+1)(n+2)}{67}} & n = 33, 34, \ldots, 65 \end{cases} \quad (5)$$

where the Zadoff-Chu root sequence index u is given by Table 3 or a subset of Table 3.

TABLE 3

Root indices for the primary synchronization signal with $N_{ZC} = 67$

| $N_{ID}^{(2)}$ | Root index u |
| --- | --- |
| 0 | 1 |
| 1 | 2 |
| 2 | 3 |
| 3 | 4 |
| ... | ... |
| 65 | 66 |

In this case, since $N_{ZC}$ is a prime number, the root index $N_{ID}^{(2)}$ may be easily chosen compared to that in Rel-8/9/10. Furthermore, another root index may be easily added for the purpose of a large cardinality of the PSS, as illustrated in Table 3, because $N_{ZC}$ is a prime number. Furthermore, a subset of the root index in Table 3 may be used. Then, the root index may be categorized for a macro cell or a pico cell via higher-layer signaling. In other words, the first several rows may be assigned only to macro cells and the other rows to pico cells. In this example, in accordance with the third property of Zadoff-Chu sequences mentioned above, the difference between any combination of two root indices is relative prime with respect to $N_{ZC}=67$.

Figure 8:
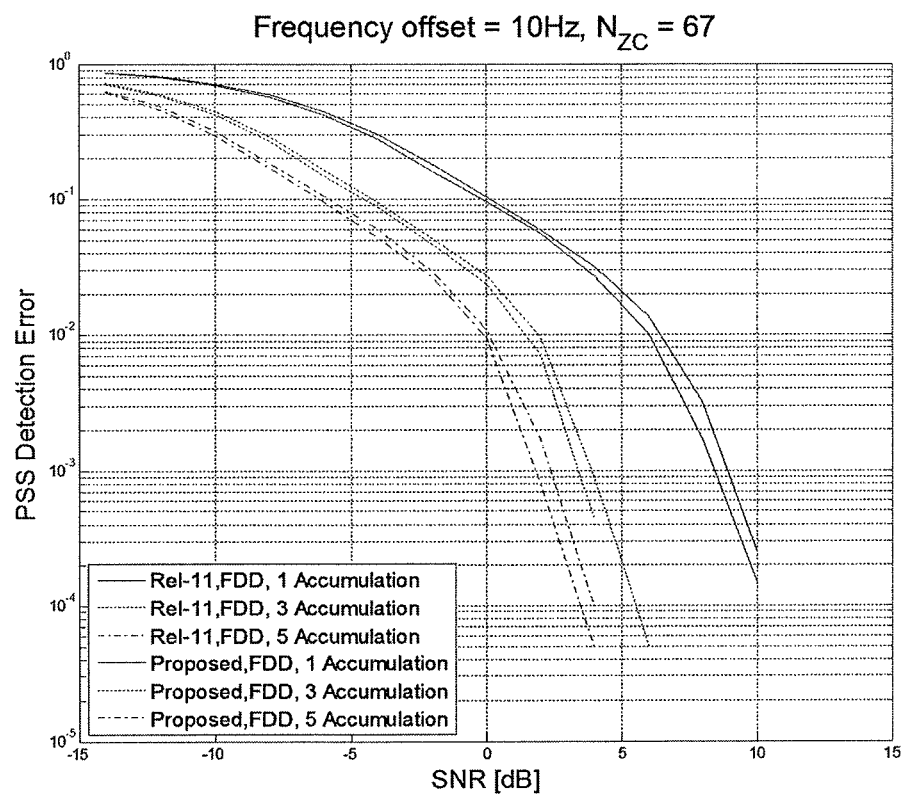
FIG. 8 is a diagram of the performance of PSS detection, according to an embodiment of the disclosure.

Table 4 illustrates simulation parameters that may be used in evaluating the performance of a time/frame synchronization based on a PSS with $N_{ZC}=67$. FIG. 8 shows the results of such a performance evaluation. For reference, the performance of the current frame synchronization scheme is also shown. As shown in FIG. 8, the detection performance of the disclosed PSS scheme under this first alternative shows about 0.7 dB gain over the existing PSS scheme.

TABLE 4

Simulation assumptions

| Parameter | Values |
| --- | --- |
| Transmission bandwidth | 10 MHz |
| Channel model | SCM, Urban Micro |
| UE speed | 3 km/h |

TABLE 4-continued

Simulation assumptions

| Parameter | Values |
| --- | --- |
| Antenna configuration | 1 TX, 1 RX |
| Number of combining PSS signals | 1, 3, 5 |
| Estimation method | Time-domain correlation for frame synchronization |

Figure 9:
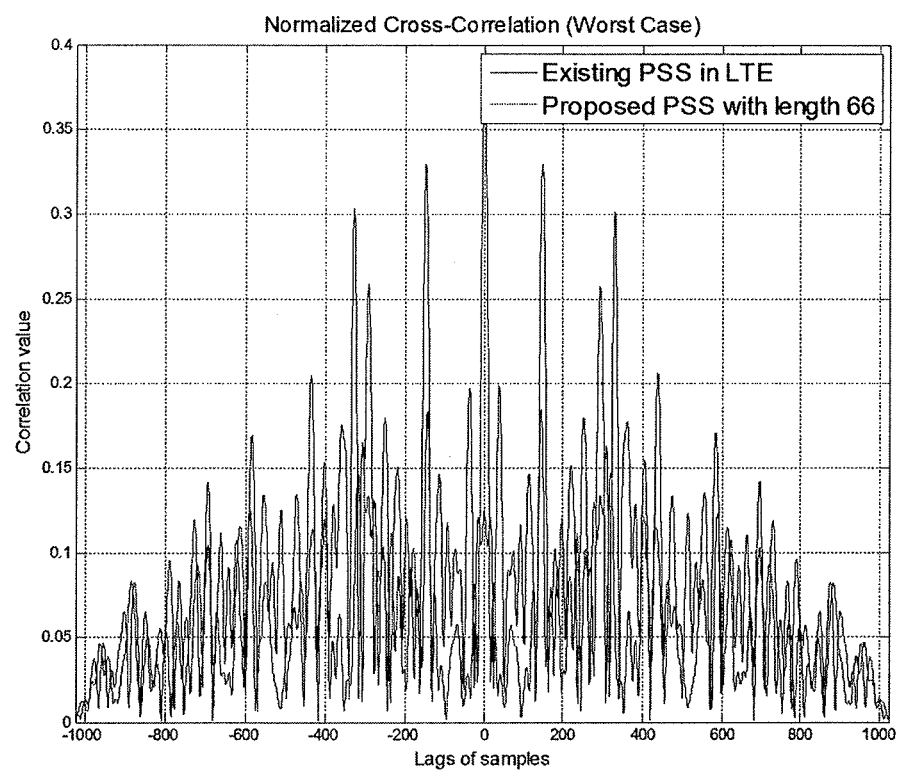
FIG. 9 is a diagram of a comparison of synchronization signals, according to an embodiment of the disclosure.

FIG. 9 shows the cross-correlations for both the existing PSS and the disclosed PSS with length 66. As depicted in FIG. 9, cross-correlation for the disclosed PSS shows better characteristics under the worst case.

In a second alternative under this first set of embodiments, PSS extensions with $N_{ZC}=71$ are disclosed. In this alternative, a new PSS occupying 70 REs out of the total available 72 REs is provided and is given by:

$$d_u(n) = \begin{cases} e^{-j\frac{\pi un(n+1)}{71}} & n = 0, 1, \ldots, 34 \\ e^{-j\frac{\pi u(n+1)(n+2)}{71}} & n = 35, 36, \ldots, 69 \end{cases} \quad (6)$$

where the Zadoff-Chu root sequence index u is given by Table 5 or a subset of Table 5.

TABLE 5

Root indices for the primary synchronization signal with $N_{ZC} = 71$

| $N_{ID}^{(2)}$ | Root index u |
| --- | --- |
| 0 | 1 |
| 1 | 2 |
| 2 | 3 |
| 3 | 4 |
| ... | ... |
| 69 | 70 |

Figure 10:
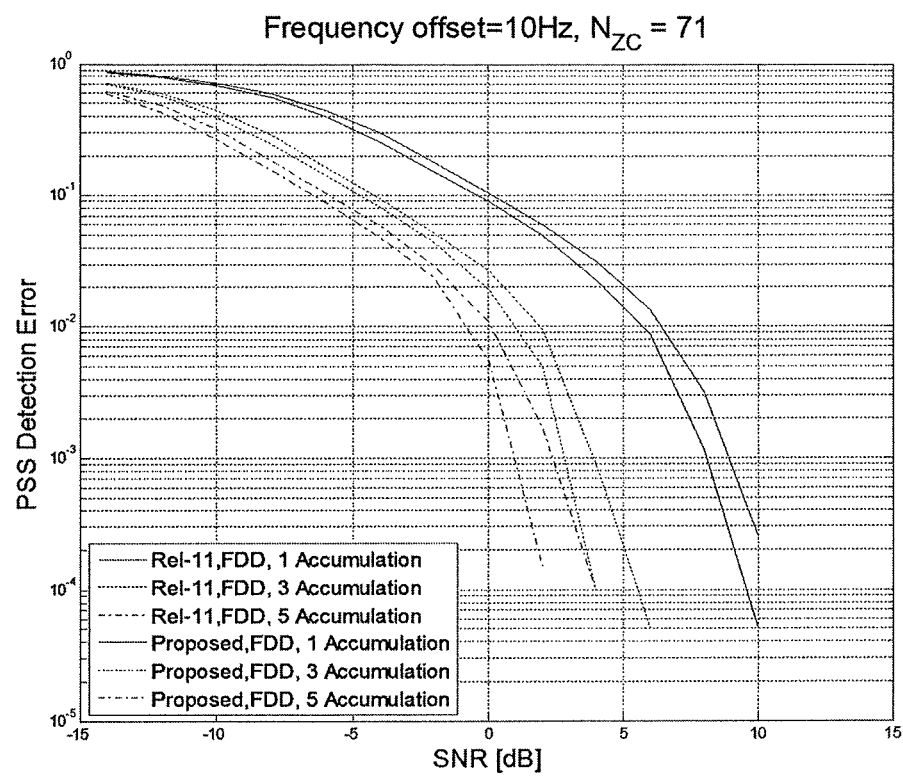
FIG. 10 is a diagram of the performance of PSS detection, according to an alternative embodiment of the disclosure.
Figure 12A:
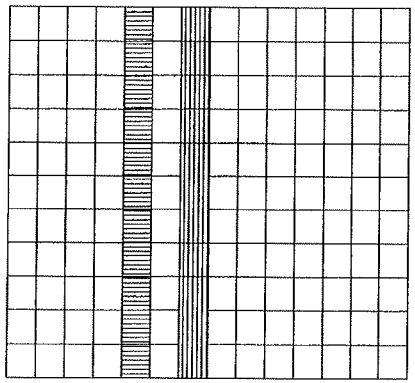
FIGS. 12a, 12b, 12c, and 12d are diagrams of examples of locations of synchronization signals for small cells, pico cells, or stand-alone NCTs, according to an alternative embodiment of the disclosure.
Figure 12B:
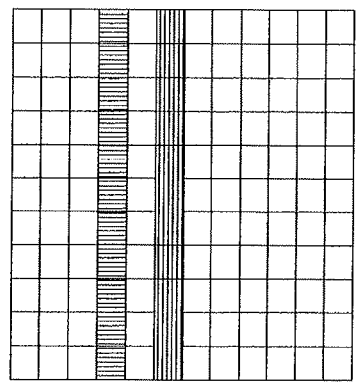
Figure 12C:
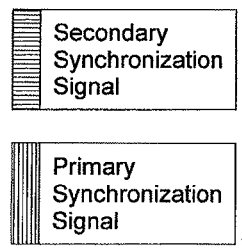
Figure 12C:
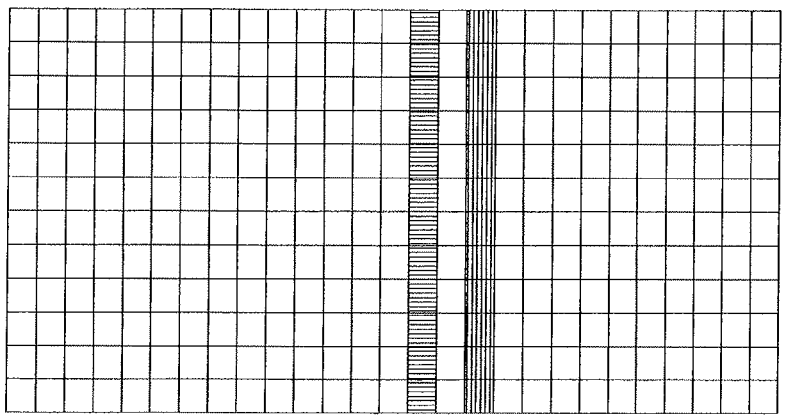
Figure 12D:
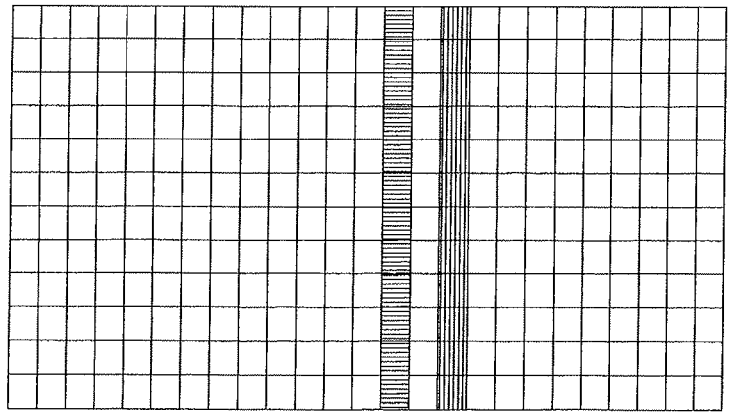

FIG. 10 shows the performance of a time/frame synchronization based on a PSS with $N_{ZC}=71$, again using the simulation parameters of Table 4. For reference, the performance of the current frame synchronization scheme is also shown. As shown in FIG. 10, the detection performance of the disclosed PSS scheme under this second alternative shows at least 1 dB gain over the existing PSS scheme in a moderate SNR regime.

A second set of embodiments directed to distinct time-frequency locations for the PSS/SSS will now be considered. In these embodiments, the synchronization signals are placed in distinct locations for macro cells and small or pico cells in heterogeneous networks. These embodiments may be combined with those related to an increased candidate set described above. These embodiments or a combination of these embodiments and the previously disclosed embodiments may provide more flexible design for interference coordination by increasing the cell ID capacity even if numerous pico cells are deployed in the coverage of a macro cell. Furthermore, the relocation of the PSS and the SSS may prevent collisions with the demodulation reference signal (DMRS).

In other words, in this second set of embodiments, the PSS and/or SSS is transmitted in subframes other than the subframes specified in the 3GPP standards. As shown in FIGS. 4a and 4b, the 3GPP standards specify that, for FDD, the PSS and the SSS are to be transmitted in subframes 0 and 5 of a radio frame. As shown in FIG. 4c and 4d, the 3GPP standards specify that, for TDD, the SSS is to be transmitted in subframes 0 and 5 and the PSS is to be transmitted in subframes 1 and 6. In this second set of embodiments, for FDD, the PSS and the SSS are transmitted in subframes other than subframe 0 and subframe 5. For TDD, the SSS is transmitted in subframes other than subframe 0 and subframe 5.

In a first alternative under this second set of embodiments, different subframes are assigned to transmit the PSS/SSS for pico cells, small cells, or cells with stand-alone NCTs. While the existing PSS/SSS resource mappings may be used for macro cells, the locations for small cells, pico cells, or cells with stand-alone NCTs are newly designed based on a relative offset with respect to the existing PSS/SSS. For example, for FDD, subframes 1 and 6 may be used for small cells or pico cells, but the locations are not limited to these subframes only. Furthermore, the PSS/SSS may be relocated only for small cells or pico cells, while the existing location for macro cells may be maintained.

In a first sub-alternative under this first alternative, the relative offsets between the PSS and the SSS may be maintained. The subframe of the PSS/SSS may be relocated to another location to avoid collisions with the existing PSS/SSS. The locations of the PSS and the SSS may be swapped with one another, while the relative offsets between the PSS and the SSS may be maintained for both FDD and TDD. As shown in FIG. 11, one subframe is shifted from the existing PSS/SSS locations.

In other words, in an embodiment, for FDD, the PSS and the SSS may be transmitted in subframes 1 and 6 or any subframes other than subframes 0 and 5. For TDD, the PSS may be transmitted in subframes 1 and 6 or any subframes other than subframes 0 and 5 or 2 and 7, and the SSS may be transmitted in subframes 2 and 7 or any subframes other than subframes 0 and 5 or 1 and 6. For both FDD and TDD, in contrast to the case in FIGS. 4a through 4d, the OFDM symbol that carries the PSS precedes in time the OFDM symbol that carries the SSS.

In a second sub-alternative under this first alternative, the relative offsets between the PSS and the SSS may be changed. The subframes of the PSS/SSS may be relocated to another location to avoid collisions with the existing PSS/SSS, and the relative offsets between the PSS and the SSS may also be changed. For example, as shown in FIG. 12, one subframe is shifted from the existing PSS/SSS locations, and the offset between the PSS and the SSS is two OFDM symbols for both FDD and TDD.

In other words, in an embodiment, for both FDD and TDD, the OFDM symbol that carries the SSS precedes in time the OFDM symbol that carries the PSS, as was the case for the 3GPP standards as depicted in FIGS. 4a through 4d. However, for FDD, the PSS and the SSS may be transmitted in subframes 1 and 6 or any subframes other than subframes 0 and 5. For TDD, the PSS may be transmitted in subframes 2 and 7 or any subframes other than subframes 0 and 5 or 1 and 6, and the SSS may be transmitted in subframes 1 and 6 or any subframes other than subframes 0 and 5 or 2 and 7. In addition, the offsets between the PSS and the SSS may be changed compared to the 3GPP standards as depicted in FIGS. 4a through 4d. For FDD, instead of the PSS and SSS being in adjacent OFDM symbols, the PSS and the SSS may be separated by at least one OFDM symbol. For TDD, instead of the PSS and SSS being separated by two OFDM symbols, the PSS and the SSS may be separated by one OFDM symbol or zero OFDM symbols.

In a second alternative under this second set of embodiments, an extended PDCCH (E-PDCCH) region may be used. That is, at least a portion of the control information that is typically placed in the legacy PDCCH region may instead be placed in a portion of the PDSCH region that can be referred to as the E-PDCCH region. In such cases where the legacy PDCCH is not used for transmitting control information, the legacy PDCCH region may be used for pico cells, small cells, or stand-alone NCTs. In an embodiment, the PSS and the SSS may be transmitted in the legacy PDCCH region, that is, in the region that would otherwise be used to transmit control information if the E-PDCCH were not present. While the existing PSS/SSS resource mappings may be used for macro cells, the locations for small cells or pico cells are newly designed based on a relative offset with respect to the existing PSS/SSS. For example, for FDD, subframes 1 and 6 may be used for the small cells or pico cells, but the locations are not limited to these subframes only.

Figures 13A, 13B:
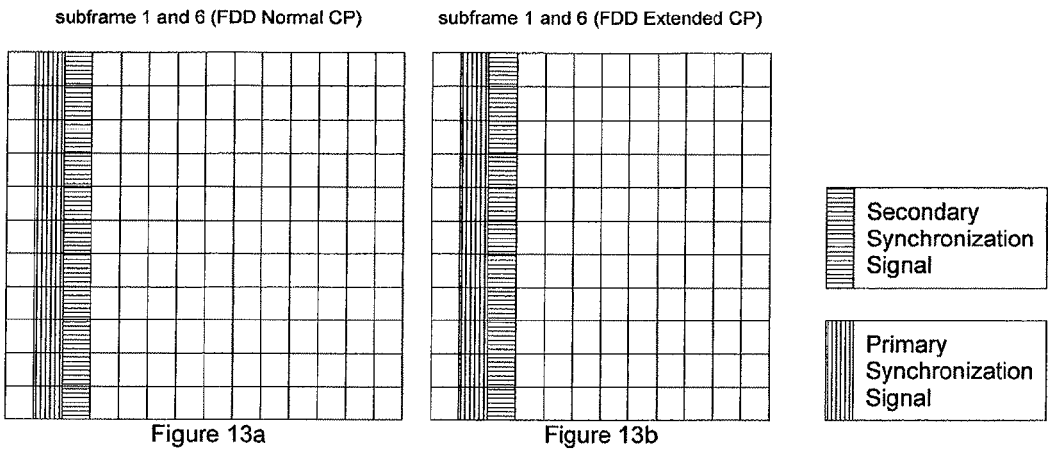
FIGS. 13a, 13b, 13c, and 13d are diagrams of examples of locations of synchronization signals for small cells, pico cells, or stand-alone NCTs, according to another alternative embodiment of the disclosure.
Figure 13C:
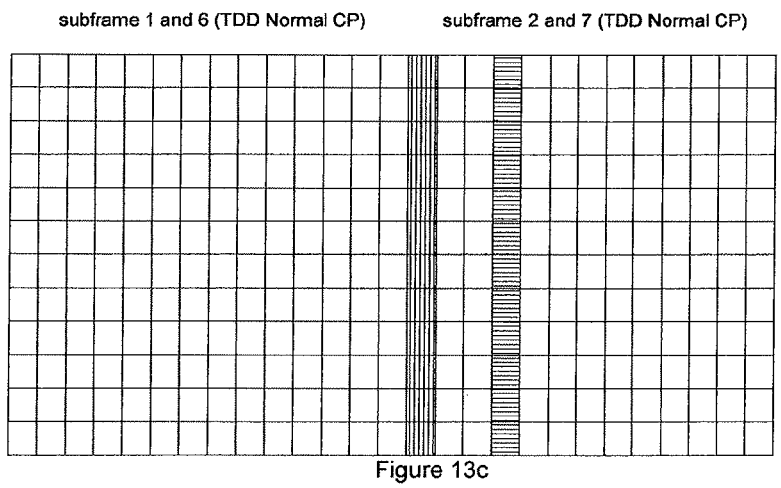
Figure 13D:
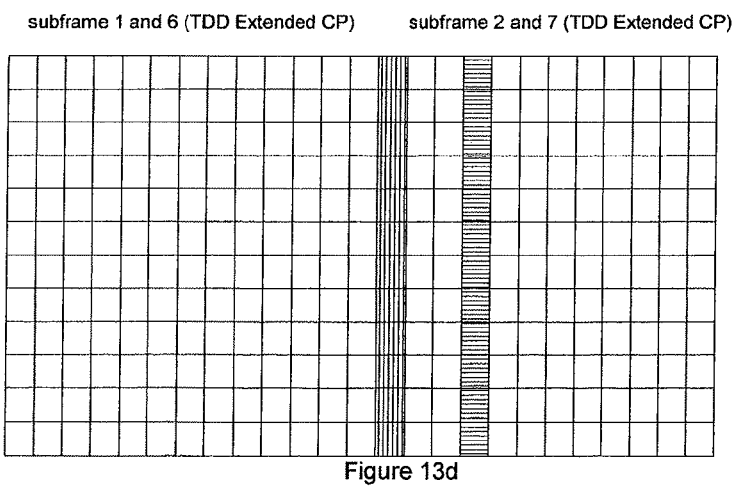
Figure 14A:
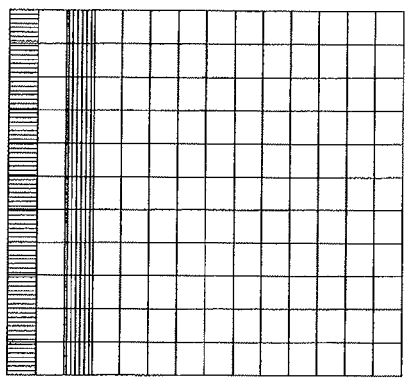
FIGS. 14a, 14b, 14c, and 14d are diagrams of examples of locations of synchronization signals for small cells, pico cells, or stand-alone NCTs, according to yet another alternative embodiment of the disclosure.
Figure 14B:
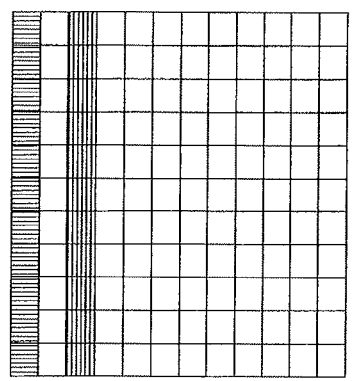
Figure 14C:
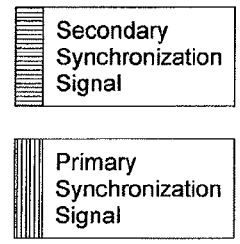
Figure 14C:
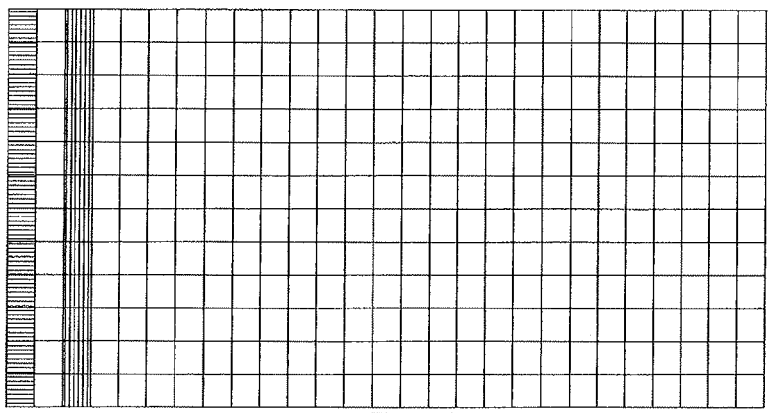
Figure 14D:
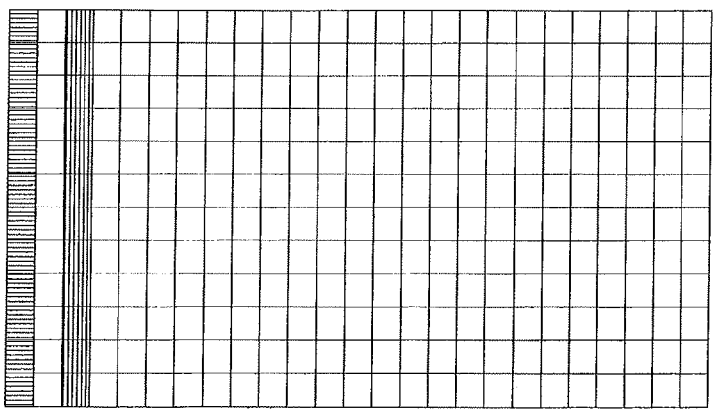

In a first sub-alternative under this second alternative, the relative offsets between the PSS and the SSS may be maintained. The subframe of the PSS/SSS may be relocated to another location to avoid collisions with the existing PSS/SSS. The locations of the PSS and the SSS may be swapped with one another, while the relative offsets between the PSS and the SSS may be maintained for both FDD and TDD. Unlike the first alternative under this second set of embodiments, where the locations are shared with both macro and small or pico cells, the existing PDCCH region may be used only for small or pico cells. As shown in FIG. 13, one subframe is shifted from the existing PSS/SSS locations.

In other words, in an embodiment, for FDD, the PSS and the SSS may be transmitted in a legacy PDCCH region in subframes 1 and 6 or any subframes other than subframes 0 and 5. The PSS and the SSS are in adjacent OFDM symbols, and the OFDM symbol that carries the PSS precedes in time the OFDM symbol that carries the SSS. For TDD, the PSS may be transmitted in subframes 1 and 6 or any subframes other than subframes 0 and 5 or 2 and 7, and the SSS may be transmitted in subframes 2 and 7 or any subframes other than subframes 0 and 5 or 1 and 6. The OFDM symbol that carries the PSS precedes in time the OFDM symbol that carries the SSS In a second sub-alternative under this second alternative, the relative offsets between the PSS and the SSS may be changed. The subframes of the PSS/SSS may be relocated to another location to avoid collisions with the existing PSS/SSS, while the relative offsets between the PSS and the SSS are two OFDM symbols for both FDD and TDD. Unlike the first alternative under this second set of embodiments, where the locations are shared with both macro and small or pico cells, the existing PDCCH region may be used only for small or pico cells. As shown in FIG. 14, one subframe is shifted from the existing PSS/SSS locations.

In other words, in an embodiment, for both FDD and TDD, the SSS precedes the PSS. Also, for both FDD and TDD, the PSS and the SSS may be transmitted in a legacy PDCCH region in subframes 1 and 6 or any subframes other than subframes 0 and 5 or 2 and 7. In addition, the offsets between the PSS and the SSS may be changed compared to the 3GPP standards as depicted in FIGS. 4a through 4d. For FDD, instead of the PSS and SSS being in adjacent OFDM symbols, the PSS and the SSS may be separated by at least one OFDM symbol. For TDD, instead of the PSS and SSS being separated by two OFDM symbols, the PSS and the SSS may be separated by one OFDM symbol or zero OFDM symbols.

In a third alternative under this second set of embodiments, one or more of the existing PSS and SSS subframe locations may be used. If the new length for $N_{ZC}$ is used, as described above with regard to the first set of embodiments, then the new PSS may be located in the existing location since the time correlation is still small. In this case, the SSS may be moved to another location to avoid collisions with the same existing SSS. Furthermore, the subset of the root index that shows better cross-correlation properties, as described above, may be selected to improve PSS detection performance.

In summary, in this second set of embodiments, at least two options are possible for transmitting the PSS and SSS. The options may stand alone or may be used in combination with one another. In a first option, an OFDM symbol that carries the PSS precedes in time an OFDM symbol that carries the SSS. In a second option, in an FDD transmission, at least one OFDM symbol is present between an OFDM symbol that carries the SSS and an OFDM symbol that carries the PSS, and in a TDD transmission, more than or less than two OFDM symbols are present between an OFDM symbol that carries the SSS and an OFDM symbol that carries the PSS. In a third option, which may stand alone be used in various combinations with the first two options, OFDM symbols that carry the PSS and SSS are placed in subframes other than the subframes specified by the 3GPP standards. In a fourth option, which may stand alone be used in various combinations with the first three options, when an E-PDCCH is used, the PSS and SSS may be transmitted in the legacy PDCCH region.

Figure 15:
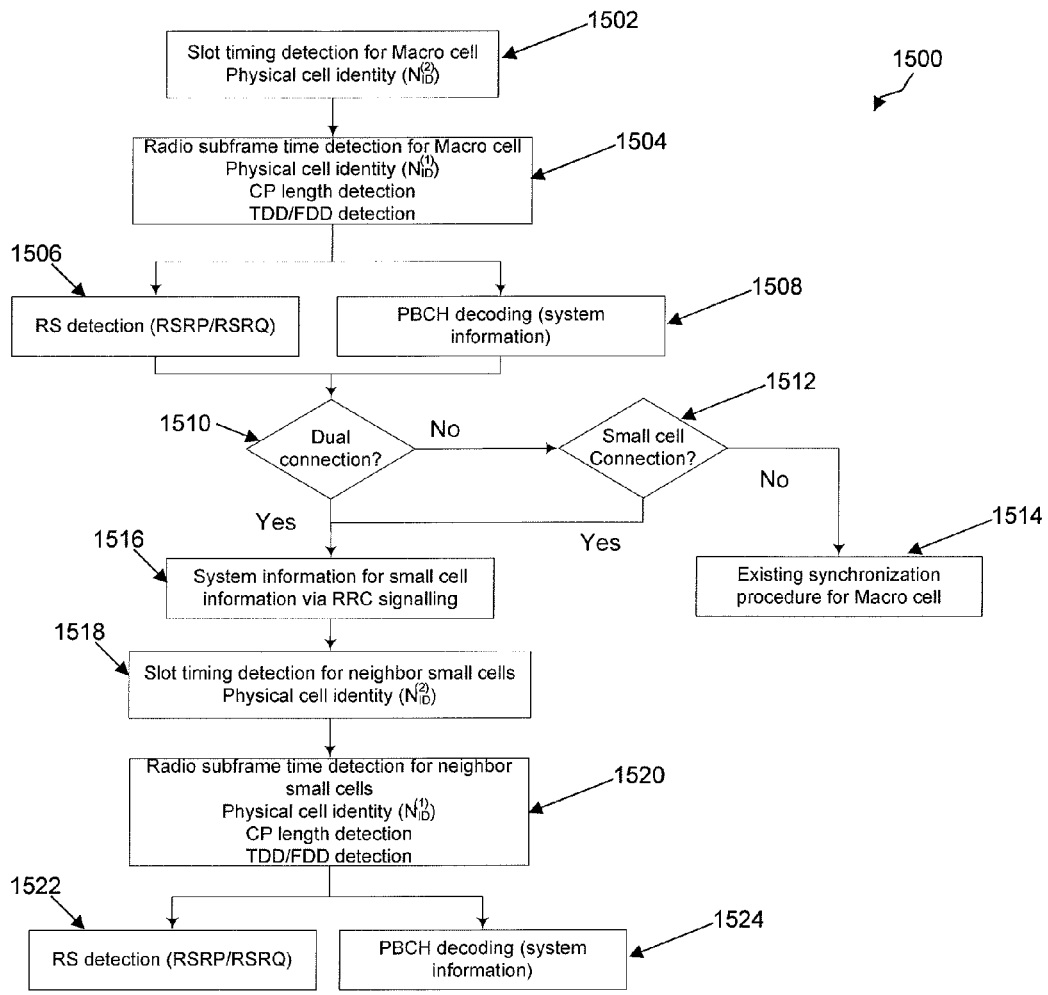
FIG. 15 is a diagram of a cell search procedure for non-overlapping PSS regions or sequences, according to an embodiment of the disclosure.

If either or both of the sets of embodiments disclosed above is employed on a densely populated network environment, such as a HetNet, a small cell, or a stand-alone NCT, at the initial synchronization, a UE may need to search a cell ID for all candidate cases upon powering up. However, since the search space over all possible combinations may present a computational burden, the search space may be reduced by the use of radio resource control (RRC) signaling or some other type of signaling that the UE may use in searching for a small cell. In other words, as an alternative, a UE may always search for macro cell locations and attach to a macro cell. Then, after establishing the connection with the macro cell, the UE may start to receive information about the neighboring small cells via higher-layer signaling or the system information block and may use that information to search for the neighboring small cells. As shown in FIG. 15, for example, if the root index is divided into two groups, one for macro cells and the other for small cells, then the neighboring cell information from the serving cell may be signaled to a UE to facilitate the neighboring cell detection. Furthermore, in this configuration, the serving cell may be a macro cell and the neighboring cells may be small cells close to the serving cell or vice versa, as shown in FIG. 15. As an alternative, system information for small cells may be transmitted on the PBCH as a part of the system information when a UE detects a macro cell. In yet another embodiment, the UE may search for an anchor small cell in a small cell cluster and attach to the anchor small cell. Then, after establishing the connection with the anchor small cell, the UE may start to receive information about the neighboring small cells in the cluster via higher-layer signaling or the system information block and may use that information to search for the neighboring small cells in the same cluster.

More specifically, FIG. 15 depicts a cell search procedure 1500 that may be followed by a UE in a heterogeneous network. The portion of FIG. 15 that includes blocks 1502 through 1508 can be seen to be substantially similar to the existing macro cell search cell procedure shown in FIG. 3. When this macro cell search procedure is complete and the UE has attached to a macro cell, the overall search procedure 1500 moves to block 1510, where it is determined whether the UE will have a dual connection, that is, whether the UE will connect to a macro cell and a small cell simultaneously. If there will not be a dual connection, the procedure 1500 moves to block 1512, where it is determined whether there will be a small cell connection. If there will not be a small cell connection, the procedure 1500 moves to block 1514, where the existing synchronization procedure for a macro cell is performed. If, at block 1510, there will be a dual connection or if, at block 1512, there will be a small cell connection, the procedure 1500 moves to block 1516. At block 1516, the macro cell transmits system information for at least one small cell via higher layer signaling, such as RRC signaling. Alternatively, the system information for the small cell may be transmitted via a system information block or in the PBCH. After receiving this small cell system information, the UE may follow a search and attachment procedure for the small cell that is similar to the search and attachment procedure that was performed for the macro cell. That is, the UE may then follow the procedures in blocks 1518 through 1524 for the small cell, which can be seen to be analogous to the procedures in blocks 1502 through 1508 for the macro cell.

A cell ID for a small cell may be useful for cases where the small cell is not synchronized with the macro cell, the small cell is stand-alone, or the small cell needs to support legacy UEs. For cases where the small cell is in the coverage of a macro cell (i.e., the small cell is not stand-alone) and is in synchronization with the macro cell or is in synchronization with another carrier in the same small cell, a cell ID may not be needed for the small cell. In such a situation, a new carrier type that does not carry synchronization signals may be used for the small cell. The macro cell may use a small cell as a data pipe for a UE. The UE may synchronize with the macro cell and then be configured by the macro cell for certain CSI-RS ports, which may be small-cell-specific. The control channel may be transmitted from the macro cell only or from the small cell as well. The UE may use the configured CSI-RS to maintain synchronization with the small cell. For data demodulation, DMRS ports may be dynamically signaled to the UE. In this way, there may be no need to support a physical cell ID for a small cell. However, a virtual cell ID may be configured for the UE as a UE-specific configuration and may be used to generate CSI-RS sequences and DMRS sequences.

Alternatively, a new carrier for a small cell may carry some type of synchronization signal to allow a UE to mainly synchronize with other small cells, but this synchronization signal might not be used to derive a physical cell ID for the small cell. As small cells may be deployed in a cluster in a macro cell, and coverage between clusters of small cells may not have much overlap, such a synchronization signal may be reused for a different cluster of small cells under a macro cell. Alternatively, a physical cell ID (PCI) may still be assigned to a small cell, but may not be used for some purposes such as radio resource management.

The UE may use a configured small-cell-specific CSI-RS for short term channel measurement and feedback and/or for long term channel measurement. The macro eNB may use such information for handover between small cells. For example, if a UE is moving from one small cell to another small cell, the macro eNB may configure the CSI-RS specific to the second small cell for the UE to measure the channel. As there may be no cell IDs assigned to small cells, or even in cases where a small cell does have a cell ID, the cell-to-cell handover between small cells under the coverage of a macro cell may not be the same as that defined in Rel-8, and the complexity of the handover may be reduced.

As described above, the synchronization signal of small cells may be configured by the macro eNB. Such configuration may be extended to include the case where a small cell does not transmit synchronization signals and does not have a cell ID. In general, a UE may access a macro cell or an anchor small cell in a small cell cluster first and then be configured to access a small cell through the macro cell or anchor small cell. If a synchronization signal is not configured for the small cell, the UE may assume that the small cell and the macro cell are in synchronization, and therefore there may be no need to conduct a separate synchronization. To be more specific, PSS transmissions and SSS transmissions may be configured separately for a small cell, which may lead to several options. A first option is that the PSS and the SSS are both configured for the small cell. A second option is that the PSS is not configured but the SSS is configured. A third option is that neither the PSS nor the SSS is configured.

In the first option, the UE may perform a full synchronization process with the small cell and obtain a cell ID for the small cell. In the second option, the UE may perform a partial synchronization with the small cell or maintain the synchronization on the SSS. For example, the UE may conduct synchronization with the macro eNB on the PSS first and then search for the SSS from the small cell for a cell ID for the small cell. This option would allow the reuse of the SSS among macro cells that have little coverage overlap. In the third option, the UE may assume that the small cell is in synchronization with the macro cell or another small cell and that there may be no need to perform any synchronization. The UE may then rely on other reference signals such as the CSI-RS to maintain synchronization with the macro cell and other small cells.

In the situation where a small cell is not in synchronization with the macro cell, for example, if the small cell is on a different frequency band from that used in the macro cell, the synchronization signal may still be transmitted at the small cell. A cell ID may still be assigned to the small cell. However, the cell ID for small cells may not be used in a handover within a macro cell. Instead, the macro cell may configure a small-cell-specific CSI-RS to achieve the handover within the macro cell and maintain the Rel-8 handover procedure between macro cells. Alternatively, a UE-specific virtual cell ID may be assigned to the UE, which may be used in a handover within the coverage of the macro cell.

If NCT is used for small cells, the synchronization signal transmitted on the small cells may be in different time, frequency, and/or sequence domains from those on the macro cell. Having the synchronization signals for small cells and macro cells in different domains may prevent legacy UEs from attempting to access small cells. The legacy UEs may then access only macro cells and may expect the same behavior as in Rel-11, such as Rel-11 handover behavior. Having the synchronization signals for small cells and macro cells in different domains may also create a second set of cell IDs for small cells that are different from the cell IDs for a macro cell.

In summary, a synchronization signal may not need to be transmitted on a small cell (or a carrier at a small cell) if the small cell is in synchronization with another cell (a macro cell or another carrier). A physical cell ID may not need to be assigned to such cell, but a virtual cell ID may be assigned. The transmission of a synchronization signal on a small cell may be part of a small cell access configuration by a macro cell. A handover within a macro cell may be achieved with a small-cell-specific CSI-RS rather than by a cell ID for a small cell, whether such an ID is assigned to the small cell or not.

The following is an example of modifications that may be made to 3GPP TS 36.211 in order to implement at least a portion of the first set of embodiments described above. The portions related to the embodiments disclosed herein are underlined.

There are 3024 unique physical layer cell identities. The physical layer cell identities are grouped into 168 unique physical layer cell identity groups, each group containing three unique identities. The grouping is such that each physical layer cell identity is part of one and only one physical layer cell identity group. A physical layer cell identity $N_{ID}^{cell}=18N_{ID}^{(1)}+N_{ID}^{(2)}$ is thus uniquely defined by a number $N_{ID}^{(1)}$ in the range of 0 to 167, representing the physical layer cell identity group, and a number $N_{ID}^{(2)}$ in the range of 0 to 17 representing the physical layer identity within the physical layer cell identity group.

The sequence d(n) used for the primary synchronization signal is generated from a frequency-domain Zadoff-Chu sequence according to:

$$d_u(n) = \begin{cases} e^{-j\frac{\pi u n(n+1)}{67}} & n = 0, 1, \ldots, 32 \\ e^{-j\frac{\pi u (n+1)(n+2)}{67}} & n = 33, 34, \ldots, 65 \end{cases}$$

where the Zadoff-Chu root sequence index u is given by Table 6.

TABLE 6

Example of root indices for the primary synchronization signal

| $N_{ID}^{(2)}$ | Root index u |
|---|---|
| 0 | 2 |
| 1 | 3 |
| 2 | 5 |
| 3 | 7 |
| 4 | 11 |
| ... | ... |
| 15 | 53 |
| 16 | 59 |
| 17 | 61 |

Figure 16:
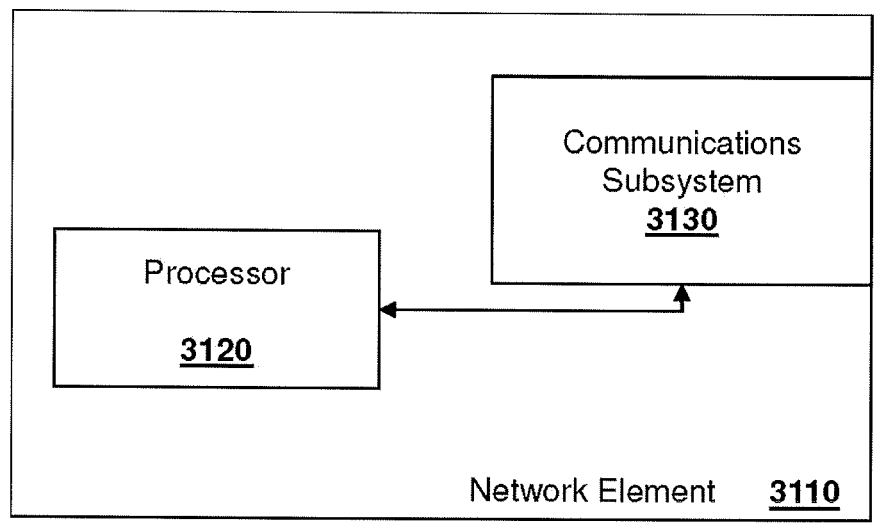
FIG. 16 is a simplified block diagram of an exemplary network element according to one embodiment.

The above may be implemented by a network element. A simplified network element is shown with regard to FIG. 16. In the figure, network element 3110 includes a processor 3120 and a communications subsystem 3130, where the processor 3120 and communications subsystem 3130 cooperate to perform the methods described above.

Figure 17:
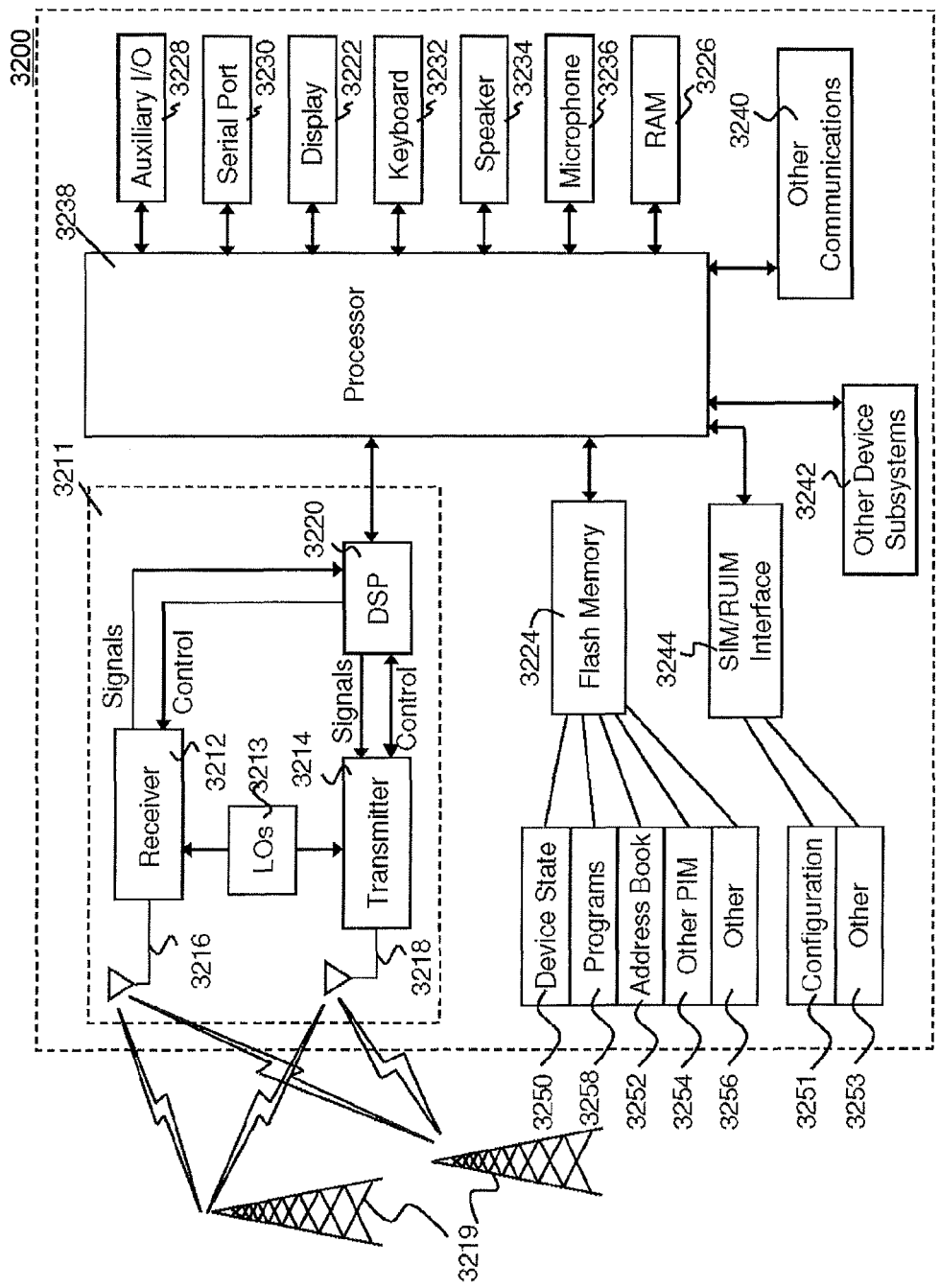
FIG. 17 is a block diagram with an example user equipment capable of being used with the systems and methods in the embodiments described herein.

Further, the above may be implemented by a UE. One exemplary device is described below with regard to FIG. 17. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219. As illustrated in the figure, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in the figure perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 18:
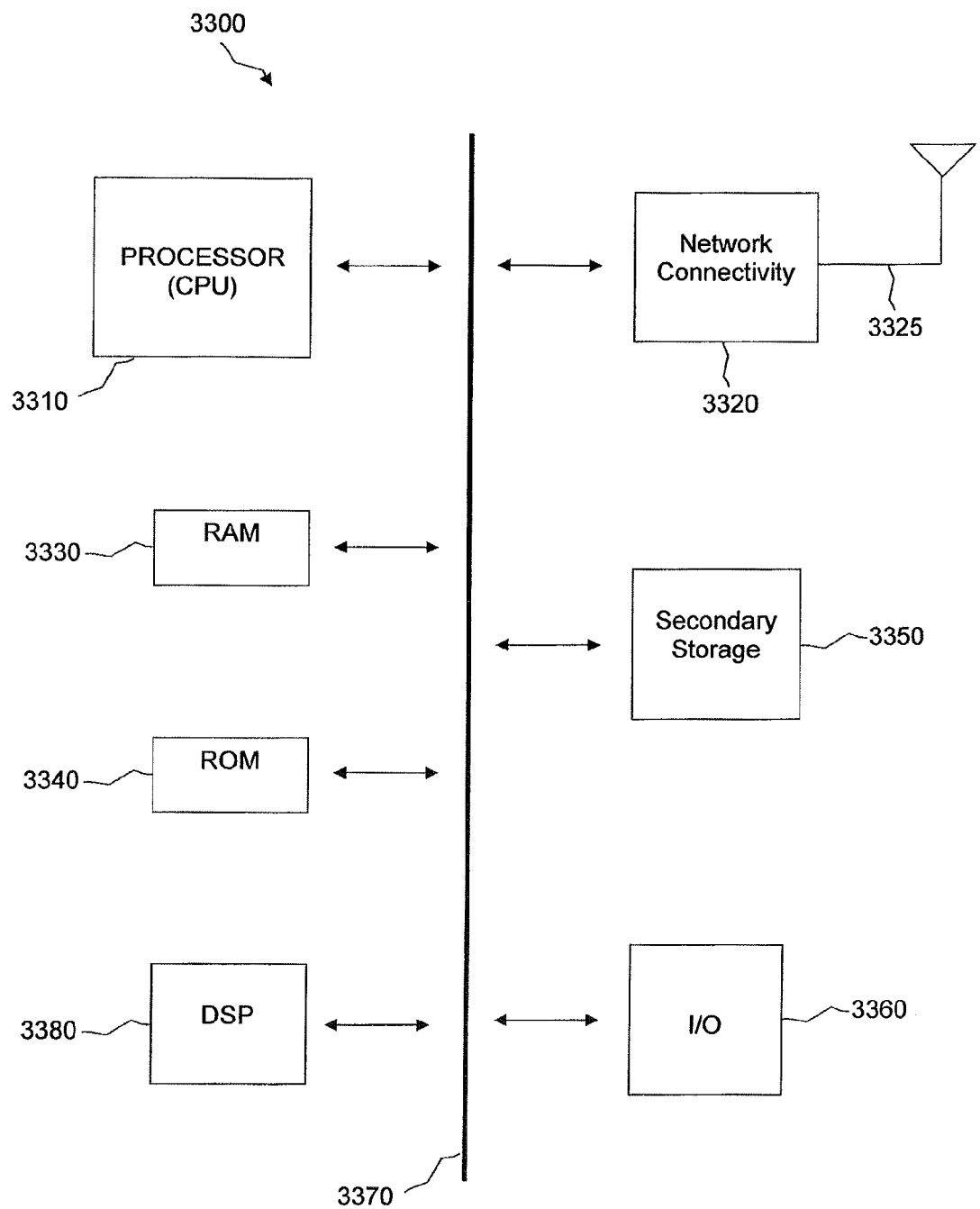
FIG. 18 illustrates a processor and related components suitable for implementing the several embodiments of the present disclosure.

The UE and other components described above might include a processing component that is capable of executing instructions related to the actions described above. FIG. 18 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method for generating a synchronization signal is provided. The method comprises using a number other than 63 as an $N_{ZC}$ value in a Zadoff-Chu sequence used in generating a primary synchronization signal for a wireless communication system. The wireless communication system may be a 3GPP LTE system or a 3GPP LTE-A system.

In another embodiment, a network element in a heterogeneous network is provided. The network element comprises a processor configured such that the network element transmits a PSS and an SSS. The transmission occurs such that at least one of: an OFDM symbol that includes the PSS precedes in time an OFDM symbol that includes the SSS; or in an FDD transmission, at least one OFDM symbol is present between an OFDM symbol that includes the SSS and an OFDM symbol that includes the PSS, and in a TDD transmission, less than two OFDM symbols are present between an OFDM symbol that includes the SSS and an OFDM symbol that includes the PSS.

In another embodiment, a method for a UE to search for a cell in a heterogeneous network is provided. The method comprises: the UE searching for and attaching to a first cell in the heterogeneous network; the UE receiving, from the first cell, via at least one of high layer signaling, a system information block, or a physical broadcast channel, information about a second cell in the heterogeneous network; and the UE using the information about the second cell to search for the second cell.

The following is incorporated herein by reference for all purposes: 3GPP Technical Specification (TS) 36.211.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for generating a synchronization signal, the method comprising:
    selecting a prime number based on a primary synchronization signal occupying a plurality of resource elements within six resource blocks, each resource block comprising twelve consecutive subcarriers; generating the primary synchronization signal using a number other than 63 as an $N_{ZC}$ value in a Zadoff-Chu sequence for a wireless communication system, wherein the number used as the $N_{ZC}$ value is a prime number equal to 53, 61, or 67,
    transmitting the primary synchronization signal and a secondary synchronization signal such that in a time division duplex (TDD) transmission, the primary synchronization signal is transmitted in a subframe other than subframe 1 or subframe 6 of a radio frame.

2. The method of claim 1, wherein the wireless communication system is one of a Third Generation Partnership Project (3GPP) Long Term Evolution (LTE) system or a 3GPP LTE-Advanced (LTE-A) system.

3. The method of claim 1, wherein the number other than 63 is 61, and wherein 71 is the maximum achievable length for the Zadoff-Chu sequence.

4. The method of claim 1, wherein the number other than 63 is 67, and wherein the primary synchronization signal occupies at least 66 resource elements out of a total available 72 resource elements for six resource blocks.

5. The method of claim 1, wherein the number other than 63 is 67, and wherein the primary synchronization signal occupies 66 resource elements out of a total available 72 resource elements and is given by the following equation:

$$d_u(n) = \begin{cases} e^{-j\frac{\pi u n(n+1)}{67}} & n = 0, 1, \ldots, 32 \\ e^{-j\frac{\pi u(n+1)(n+2)}{67}} & n = 33, 34, \ldots, 65 \end{cases}$$

where the Zadoff-Chu root sequence index u is given by at least a portion of the following table:

| $N_{ID}^{(2)}$ | Root index u |
|---|---|
| 0 | 1 |
| 1 | 2 |
| 2 | 3 |
| 3 | 4 |
| ... | ... |
| 65 | 66 |

6. The method of claim 1, wherein the primary synchronization signal occupies 70 resource elements out of a total available 72 resource elements and is given by the following equation:

$$d_u(n) = \begin{cases} e^{-j\frac{\pi u n(n+1)}{71}} & n = 0, 1, \ldots, 34 \\ e^{-j\frac{\pi u(n+1)(n+2)}{71}} & n = 35, 36, \ldots, 69 \end{cases}$$

where the Zadoff-Chu root sequence index u is given by at least a portion of the following table:

| $N_{ID}^{(2)}$ | Root index u |
|---|---|
| 0 | 1 |
| 1 | 2 |
| 2 | 3 |
| 3 | 4 |
| ... | ... |
| 69 | 70 |

7. The method of claim 1, wherein the primary synchronization signal and a secondary synchronization signal are transmitted such that at least one of:
    an orthogonal frequency division multiplexing (OFDM) symbol that carries the primary synchronization signal precedes in time at least one OFDM symbol that carries the secondary synchronization signal;
    in a frequency division duplex (FDD) transmission, at least one OFDM symbol is present between an OFDM symbol that carries the secondary synchronization signal and an OFDM symbol that carries the primary synchronization signal, and, in a time division duplex (TDD) transmission, less than or more than two OFDM symbols are present between an OFDM symbol that carries the secondary synchronization signal and an OFDM symbol that carries the primary synchronization signal; or
    in the FDD transmission, the primary synchronization signal and the secondary synchronization signal are transmitted in subframes other than subframe 0 or subframe 5 of a radio frame, and in the TDD transmission, the primary synchronization signal is transmitted in a subframe other than subframe 1 or subframe 6 of a radio frame and/or the secondary synchronization signal is transmitted in a subframe other than subframe 0 or subframe 5 of a radio frame.

8. A network element in a heterogeneous network, the network element comprising:
    a processor configured such that the network element transmits a primary synchronization signal and a secondary synchronization signal, the transmission occurring such that at least one of:
    an orthogonal frequency division multiplexing (OFDM) symbol that carries the primary synchronization signal precedes in time at least one OFDM symbol that carries the secondary synchronization signal; or
    in a frequency division duplex (FDD) transmission, at least one OFDM symbol is present between an OFDM symbol that carries the secondary synchronization signal and an OFDM symbol that carries the primary synchronization signal, and, in a time division duplex (TDD) transmission, less than or more than two OFDM symbols are present between an OFDM symbol that carries the secondary synchronization signal and an OFDM symbol that carries the primary synchronization signal, wherein, when the OFDM symbol that carries the primary synchronization signal precedes in time the OFDM symbol that carries the secondary synchronization signal, in the FDD transmission, the primary synchronization signal and the secondary synchronization signal are transmitted in subframes other than subframe 0 or subframe 5 of a radio frame, and in the TDD transmission, the primary synchronization signal is transmitted in a subframe other than subframe 1 or subframe 6 of a radio frame and the secondary synchronization signal is transmitted in a subframe other than subframe 0 or subframe 5 of a radio frame.

9. The network element of claim 8, wherein, when in the FDD transmission at least one OFDM symbol is present between an OFDM symbol that carries the secondary synchronization signal and an OFDM symbol that carries the primary synchronization signal, and in the TDD transmission less than two OFDM symbols are present between an OFDM symbol that carries the secondary synchronization signal and an OFDM symbol that carries the primary synchronization signal, in the FDD transmission, the primary synchronization signal and the secondary synchronization signal are transmitted in subframes other than subframe 0 or subframe 5 of a radio frame, and in the TDD transmission, the primary synchronization signal is transmitted in a subframe other than subframe 1 or subframe 6 of a radio frame and the secondary synchronization signal is transmitted in a subframe other than subframe 0 or subframe 5 of a radio frame.

10. The network element of claim 8, wherein, when in the FDD transmission at least one OFDM symbol is present between an OFDM symbol that carries the secondary synchronization signal and an OFDM symbol that carries the primary synchronization signal, and in the TDD transmission less than two OFDM symbols are present between an OFDM symbol that carries the secondary synchronization signal and an OFDM symbol that carries the primary synchronization signal, the primary synchronization signal and the secondary synchronization signal are transmitted in subframes other than subframe 0 or subframe 5 of a radio frame.

11. The network element of claim 8, wherein, when control information is transmitted in an extended physical downlink control channel (E-PDCCH) region within a physical downlink shared channel (PDSCH) region, the transmission further includes an option of transmitting the primary synchronization signal and the secondary synchronization signal in a legacy PDCCH region that, if the E-PDCCH region was not present, would be used to transmit the control information.

12. A method for a user equipment (UE) to search for a cell in a wireless network, the method comprising:
the UE searching for and attaching to a first cell in the wireless network;
the UE receiving, from the first cell, via at least one of high layer signaling, a system information block, or a physical broadcast channel, information about a second cell in the wireless network; and
the UE using the information about the second cell to search for the second cell,
wherein the UE is configured such that in a frequency division duplex transmission, the UE receives a primary synchronization signal and a secondary synchronization signal in subframes other than subframe 0 or subframe 5 of a radio frame, and in a time division duplex transmission, the UE receives the primary synchronization signal in a subframe other than subframe 1 or subframe 6 of a radio frame and receives the secondary synchronization signal in a subframe other than subframe 0 and subframe 5 of a radio frame.

13. The method of claim 12, wherein the first cell is one of a macro cell or a first small cell in a cluster of small cells, and wherein the second cell is a second small cell in the cluster of small cells.

14. The method of claim 12, wherein the primary synchronization signal is generated using a number other than 63 as an $N_{ZC}$ value in a Zadoff-Chu sequence used in generating a primary synchronization signal for a wireless communication system, wherein the wireless communication system is a Third Generation Partnership Project (3GPP) Long Term Evolution (LTE) system or a 3GPP LTE-Advanced (LTE-A) system, wherein the number used as the $N_{ZC}$ value is a prime number equal to 53, 61, or 67, the prime number being selected based on the primary synchronization signal occupying a plurality of resource elements within at least six resource blocks, each resource block comprising 12 consecutive subcarriers.

15. The method of claim 12, wherein the UE receives information for facilitating detection of a neighboring cell, the information including a cell identifier generated based on a root index divided into a first group for macro cells in the heterogeneous network and a second group for small cells in the heterogeneous network.

16. The method of claim 12, wherein, when at least a portion of the second cell is within a coverage area of the first cell and is in synchronization with the first cell or with a carrier in the second cell, the second cell is not provided with a cell identifier and does not transmit synchronization signals.

17. The method of claim 12, wherein the synchronization signal allows the UE to synchronize with a plurality of small cells, and wherein the synchronization signal is not used to derive a physical cell identity for one of the small cells, and wherein the synchronization signal is reused for a different plurality of small cells.

18. The method of claim 12, wherein the UE uses a small-cell-specific channel state information reference signal (CSI-RS) for at least one of short term channel measurement and feedback or long term channel measurement, and wherein the UE further uses the CSI-RS in a handover procedure.

19. The method of claim 12, wherein, when the UE is not configured to receive a synchronization signal from the second cell, the UE assumes that the second cell and the first cell are in synchronization and does attempt to conduct a separate synchronization for the second cell.

20. The method of claim 12, wherein, when a primary synchronization signal and a secondary synchronization signal are both configured for the second cell, the UE performs a full synchronization process with the second cell and obtains a cell identifier for the second cell.

21. The method of claim 12, wherein, when a primary synchronization signal is not configured for the second cell but a secondary synchronization signal is configured for the second cell, the UE performs a partial synchronization with the second cell or maintains an existing synchronization on the secondary synchronization signal.

22. The method of claim 12, wherein, when neither a primary synchronization signal nor a secondary synchronization signal is configured for the second cell, the UE assumes that the second cell is in synchronization with the first cell and uses another reference signal to maintain synchronization with at least the first cell.

23. The method of claim 12, wherein, when the second cell is not in synchronization with the first cell, the second cell transmits a synchronization signal and is assigned a cell identifier, and wherein a small-cell-specific CSI-RS, rather than the cell identifier, is used to achieve a handover of the UE within the coverage of the first cell.

24. The method of claim 13, wherein, regardless of whether or not a physical cell identifier is used for the second cell, a virtual cell identifier is assigned to the UE, the virtual cell identifier being used for handover within the cluster of small cells or within the macro cell, and being used to generate at least one demodulation reference signal (DMRS) sequence.

* * * * *